United States Patent
Hiruma et al.

(10) Patent No.: US 8,470,420 B2
(45) Date of Patent: Jun. 25, 2013

(54) HEAT-SHRINKABLE FILM, MOLDINGS AND HEAT-SHRINKABLE LABELS MADE USING THE HEAT-SHRINKABLE FILM, AND CONTAINERS MADE BY USING THE MOLDINGS OR FITTED WITH THE LABELS

(75) Inventors: Takashi Hiruma, Shiga (JP); Takeyoshi Yamada, Shiga (JP); You Miyashita, Shiga (JP); Kouichi Sawa, Shiga (JP); Kazuya Tanaka, Shiga (JP); Jun Takagi, Shiga (JP)

(73) Assignee: Mitsubishi Plastics, Inc., Tokyo (JP)

( * ) Notice: Subject to any disclaimer, the term of this patent is extended or adjusted under 35 U.S.C. 154(b) by 769 days.

(21) Appl. No.: 11/913,863

(22) PCT Filed: May 11, 2006

(86) PCT No.: PCT/JP2006/309489
§ 371 (c)(1),
(2), (4) Date: Jan. 11, 2008

(87) PCT Pub. No.: WO2006/121118
PCT Pub. Date: Nov. 16, 2006

(65) Prior Publication Data
US 2009/0074999 A1    Mar. 19, 2009

(30) Foreign Application Priority Data

| May 11, 2005 | (JP) | 2005-138473 |
| Dec. 12, 2005 | (JP) | 2005-358106 |
| Dec. 28, 2005 | (JP) | 2005-378969 |
| Dec. 28, 2005 | (JP) | 2005-379196 |

(51) Int. Cl.
*B32B 23/00* (2006.01)
*B32B 1/02* (2006.01)

(52) U.S. Cl.
USPC ....... 428/34.9; 428/34.1; 428/34.2; 428/35.7; 428/35.9; 428/36.9

(58) Field of Classification Search
USPC ............. 428/34.1, 35.7, 35.9, 36.9, 34.2, 428/34.7
See application file for complete search history.

(56) References Cited

U.S. PATENT DOCUMENTS

| 5,484,881 A | 1/1996 | Gruber et al. |
| 5,536,807 A | 7/1996 | Gruber et al. |
| 5,585,191 A | 12/1996 | Gruber et al. |
| 5,773,562 A | 6/1998 | Gruber et al. |
| 5,798,436 A * | 8/1998 | Gruber et al. ............. 528/354 |
| 5,834,582 A * | 11/1998 | Sinclair et al. ............. 528/354 |
| 5,866,634 A * | 2/1999 | Tokushige et al. ............. 523/124 |
| 6,005,068 A | 12/1999 | Gruber et al. |
| 6,093,791 A | 7/2000 | Gruber et al. |
| 6,121,410 A | 9/2000 | Gruber et al. |
| 6,207,792 B1 | 3/2001 | Gruber et al. |
| 7,132,490 B2 * | 11/2006 | Obuchi et al. ............. 526/317.1 |
| 7,160,949 B2 * | 1/2007 | Ota et al. ............. 525/242 |
| 2002/0094444 A1 * | 7/2002 | Nakata et al. ............. 428/480 |
| 2005/0227099 A1 | 10/2005 | Hiruma |
| 2006/0160984 A1 | 7/2006 | Nagasawa et al. |
| 2007/0032577 A1 | 2/2007 | Kanzawa et al. |

FOREIGN PATENT DOCUMENTS

| JP | 7-504227 A | 5/1995 |
| JP | 7-256753 A | 10/1995 |
| JP | 8-300481 A | 11/1996 |
| JP | 9-151310 A | 6/1997 |
| JP | 9-169896 A | 6/1997 |
| JP | 9-316310 A | 12/1997 |
| JP | 2000-191895 A | 7/2000 |
| JP | 2000-219803 A | 8/2000 |
| JP | 2000-280342 A | 10/2000 |
| JP | 2000273210 | 10/2000 |
| JP | 2001-11214 A | 1/2001 |
| JP | 2001-31853 A | 2/2001 |
| JP | 2001-171059 A | 6/2001 |
| JP | 2003-119367 A | 4/2003 |
| JP | 2003-183488 A | 7/2003 |
| JP | 2003-286400 A | 10/2003 |
| JP | 2003-286401 A * | 10/2003 |
| JP | 2004-285258 A | 10/2003 |
| JP | 2004-2776 A | 1/2004 |
| JP | 2005-036054 A | 2/2005 |
| WO | 94/07941 A1 | 4/1994 |
| WO | WO-2004087812 A1 | 10/2004 |
| WO | 2005040255 | 5/2005 |

OTHER PUBLICATIONS

Office action mailed Apr. 9, 2009 in related Korean Application No. 10-2007-7028964.
Database WPI Week 200538. Derwent Publications Ltd., London, GB; AN 2005-372047 (XP002481322).
Database WPI Week 200108. Derwent Publications Ltd., London, GB; AN 2001-074298 (XP002481323).

* cited by examiner

*Primary Examiner* — Marc Patterson
(74) *Attorney, Agent, or Firm* — Oblon, Spivak, McClelland, Maier & Neustadt, L.L.P.

(57) ABSTRACT

A heat-shrinkable film which is excellent in mechanical characteristics such as heat shrinkage characteristics, impact resistance, and transparency and in the finish of shrinkage and which is suitable for shrink packaging, shrink bundling, shrinkable labels, and so on. A film which is made from a mixed resin comprising as the main components either a polylactic acid resin (A) and a (meth)acrylic resin (B) or a polylactic acid resin (A) and a silicone/acrylic composite rubber (D) or has at least one layer made from the mixed resin and which exhibits a heat shrinkage percentage of 20% or above in the main shrinkage direction when dipped in water at 80° C. for 10 seconds.

29 Claims, No Drawings

HEAT-SHRINKABLE FILM, MOLDINGS AND HEAT-SHRINKABLE LABELS MADE USING THE HEAT-SHRINKABLE FILM, AND CONTAINERS MADE BY USING THE MOLDINGS OR FITTED WITH THE LABELS

CROSS-REFERENCE TO PRIOR APPLICATION

This is a U.S. National Phase Application under 35 U.S.C. §371 of International Patent Application No. PCT/US2006/309489 filed May 11, 2006, which claims the benefit of Japanese Patent Application Nos. 2005-138473 filed May 11, 2005, 2005-358106 filed Dec. 12, 2005, 2005-378969 filed Dec. 28, 2005 and 2005-379196 filed Dec. 28, 2005, all of them are incorporated by reference herein. The International Application was published in Japanese on Nov. 16, 2006 as WO 2006/121118 A1 under PCT Article 21 (2).

Heat-shrinkable film, moldings and heat-shrinkable labels made using the heat-shrinkable film, and containers made by using the moldings or fitted with the labels

TECHNICAL FIELD

The present invention relates to heat-shrinkable film, as well as moldings and heat-shrinkable labels made using the heat-shrinkable film, and containers made by using the moldings or fitted with the labels, and more particularly relates to heat-shrinkable film with superior shrink characteristics, impact resistance, transparency and the like, which can be applied to such uses as shrink packaging, shrink wrap packaging, and shrink labels, as well as to moldings and heat-shrinkable labels made using the heat-shrinkable film, and containers made by using the moldings or fitted with the labels.

BACKGROUND ART

Currently, cold beverages such as juice and alcoholic beverages such as beer are sold in containers such as glass and PET bottles. Printed heat-shrinkable labels are often fitted to the outside of the containers in order to differentiate from other products and to improve product visibility. Normally polyvinyl chloride, polyester, polystyrene and the like are used as the materials for these heat-shrinkable labels.

Polyvinyl chloride group (called "PVC group" hereinafter) heat-shrinkable films have satisfactory finish of shrinkage and natural shrinkage characteristics (specifically, the natural shrinkage rate is small), and have been broadly used in the past for heat-shrinkable labels. Nonetheless, when incinerating after use, the PVC group produces toxic gases such as hydrogen chloride and dioxin, and therefore in recent years heat-shrinkable films using materials to substitute for the PVC group have been developed from the perspective of environmental safety.

In addition, although polystyrene group heat-shrinkable films, which have styrene-butadiene block copolymer (SBS) as the main material, have the advantage of better finish of shrinkage than PVC group and polyester group heat-shrinkable films, the polystyrene group has such problems as being less elasticity and having inferior natural shrinkage.

Polyester group heat-shrinkable films, which are rigid at room temperature, have low-temperature shrinkage, and have excellent natural shrinkage, are mainly used for the aforementioned uses. Nonetheless, compared to PVC group heat-shrinkable films, polyester group heat-shrinkable films have the problem of being prone to produce shrink marks and wrinkles.

Meanwhile, the aforementioned plastic films are chemically stable and do not decompose when discarded into the natural environment, and therefore there is the concern about the problems of accumulation as trash and the advance of environmental pollution. Moreover, the aforementioned plastic films are produced from petrochemical resources such as oil, and thus there is concern about exhausting petrochemical resources in the future.

From the perspective of reducing the aforementioned problems, biodegradable plastics derived from plants such as polylactic acid resins are known as materials that contribute to the economization of petrochemical resources.

These polylactic acid resins are plastics derived from plants such as corn and potatoes that are a source of lactic acid obtained from starches, and have gained particular attention for use in films and the like because of superior transparency.

However, because of the brittleness of the material itself, polylactic acid resin alone is not sufficiently strong when formed into sheets or films, and is difficult to use in practical applications. Specifically, with uniaxial shrinkable film that is drawn out along one axis, the brittleness in the direction that is not extended is not improved by extension, and adequate mechanical characteristics such as impact resistance cannot be obtained. In addition, crystallization is promoted when heating, and there is the problem that sufficient heat shrinkage cannot be obtained.

Various methods that have a resin composition contained in the polylactic acid resin have been proposed to improve such mechanical characteristics as the impact resistance of the aforementioned polylactic acid resin. For example, the following have been disclosed: a compound having polymethacrylic acrylate resin contained in polylactic acid resins have a specified weight mean molecular weight (refer to Patent Literature 1); a compound having aliphatic polyesters other than polylactic acid contained in the polylactic acid resin (refer to Patent Literature 2); a compound having polycaprolactone contained in the polylactic acid (refer to Patent Literature 3); a compound having polyolefins such as ethylene-vinyl acetate copolymer contained in the polylactic acid resin (refer to Patent Literature 4); a compound having aliphatic aromatic polyesters contained in polylactic acid resins with an adjusted L-lactic acid and D-lactic acid copolymer ratio (refer to Patent Literature 5); a compound having a polyolefin such as ethylene-vinyl acetate contained in the polylactic acid resins (refer to Patent Literature 6); and a compound with improved finish of shrinkage by adjusting the degree of crystallization of the polylactic acid resin, and by further blending an aliphatic polyester resin (refer to Patent Literature 7).

However, the main object of the polylactic acid resins described in the aforementioned Patent Literature 1 was to improve the heat resistance and transparency, and there is the problem of applying this to improving the finish of shrinkage as a heat-shrinkable film. The object of the polylactic acid resins described in Patent Literature 2 to 4 was to improve brittleness characteristics which maintaining transparency, and it is difficult to apply this to improving the finish of shrinkage as a heat-shrinkable film.

Further, the polylactic acid resin described in Patent Literature 5 and 7 could suppress the crystallization of the heat-shrinkable film when heating, but there are the problems of shrinkage shrink marks, wrinkles and blisters produced by sudden shrinkage. Further, the polylactic acid resin described in the aforementioned Patent Literature 6 has the problem that a satisfactory finish of shrinkage as a heat-shrinkable film could not yet be obtained compared to that of the polyvinyl chloride heat-shrinkable films.

Further, the following methods to improve the brittleness of the polylactic acid resins have been disclosed: a method using a composition comprising a compound of polylactic acid and modified olefin (refer to Patent Literature 8); a method using a plasticized polylactic acid composition comprising a polymer with polylactic acid as the main component, and an aliphatic polyester plasticizer comprising aliphatic carboxylic acid and chained molecular diols as the main components (refer to Patent Literature 9); a method using a biodegradable resin composition comprising polylactic acid and epoxyized diene block copolymers (refer to Patent Literature 10); a method using a lactic acid polymer composition comprising polylactic acid, aliphatic polyester, and polycaprolactone (refer to Patent Literature 11); and a method using a polylactic acid resin composition comprising crystalline polylactic acid and at least one rubber component selected from natural rubber and polyisoprene (refer to Patent Literature 12).

However, when mixing the aforementioned polycaprolactone, modified olefin compound, epoxyized diene group block copolymer, natural rubber and polyisoprene and the like into the lactic acid resin, although an effect to improve impact resistance is observed, there is a notable loss of transparency as a result, and it is difficult to say that, for example, the technology is sufficient for uses that require confirmation of the contents inside the packaging material.

Moreover, there is a well-known method to improve impact resistance by compounding into polylactic acid resin impact improvement agents with a multi-layer structure that contains polyacetal resin and diene rubber, natural rubber, silicone rubber, polyurethane rubber, of methyl (meth)acrylate in a shell layer, and at least one selected from a styrene unit and a butadiene unite in a core layer (refer to Patent Literature 13), but this is not sufficient as a heat-shrinkable film.

Further, a method compounding a graft copolymer by graft copolymerization of a rubber polymer and vinyl monomer in the polylactic acid resin has been proposed (refer to Patent Literature 13), but this is not sufficient as a heat-shrinkable film.

Patent Literature 1: Japan Laid-open Patent Application No. 2005-036054
Patent Literature 2: Japan Laid-open Patent Application No. H9-169896
Patent Literature 3: Japan Laid-open Patent Application No. H8-300481
Patent Literature 4: Japan Laid-open Patent Application No. H9-151310
Patent Literature 5: Japan Laid-open Patent Application No. 2003-119367
Patent Literature 6: Japan Laid-open Patent Application No. 2001-011214
Patent Literature 7: Japan Laid-open Patent Application No. 2000-280342
Patent Literature 8: Japan Laid-open Patent Application No. H09-316310
Patent Literature 9: Japan Laid-open Patent Application No. 2000-191895
Patent Literature 10: Japan Laid-open Patent Application No. 2000-219803
Patent Literature 11: Japan Laid-open Patent Application No. 2001-031853
Patent Literature 12: Japan Laid-open Patent Application No. 2003-183488
Patent Literature 13: Japan Laid-open Patent Application No. 2003-286400
Patent Literature 14: Japan Laid-open Patent Application No. 2004-285258

DISCLOSURE OF THE INVENTION

Problems to Be Solved by the Invention

With the foregoing problems in view, an object of the present invention is to obtain a heat-shrinkable film that is superior in mechanical characteristics such as heat-shrinkable characteristics, impact resistance and transparency, and in finish of shrinkage, and that is applicable to such uses as shrink packaging, shrink wrap packaging, and shrinkable labels.

Another object of the present invention is to obtain moldings using packaging and shrinkable labels, heat-shrinkable labels, and containers fitted with the aforementioned moldings or heat-shrinkable labels.

Means Solving the Problems

The heat-shrinkable film related to the present invention is characterized by comprising a mixed resin containing a polylactic acid resin (A) or having at least 1 layer that is a layer of this mixed resin, and by having a heat shrinkage rate of 20% or more in the film main shrinkage direction when immersed in 80° C. water for 10 seconds.

Moreover, in addition to polylactic acid resin (A), (meth)acrylic resin (B) and rubber component (C) may be further comprised as the mixed resin, and the mass ratio of the (meth)acrylic resin (B) and the mass ratio of the rubber component (C) to the polylactic acid resin (A) may be within a specified range.

Further, in addition to polylactic acid resin (A), silicone/acrylic composite rubber (D) may be comprised as a main component as the mixed resin, and the mass ratio of the silicone/acrylic composite rubber (D) to this polylactic acid resin (A) may be within a specified range.

Further, the heat-shrinkable film related to the present invention may be made into a sheet having at least 2 layers of a layer (I) comprising a mixed resin containing rubber component (C) in addition to the polylactic acid resin (A), and of a layer (II) having a main component of polylactic acid resin (A).

Effects of the Invention

According to the present invention, a heat-shrinkable film superior in heat-shrinkable characteristics and applicable to such uses as shrink packaging, shrink wrap packaging and shrinkable labels may be offered.

Further, according to the present invention, moldings using packaging and shrinkable labels, heat-shrinkable labels, and containers fitted with the aforementioned moldings or heat-shrinkable labels may be offered.

Moreover, if (meth)acrylic resin (B) and rubber component (C) are used, a heat-shrinkable film that is superior in mechanical characteristics such as heat-shrinkable characteristics, impact resistance and transparency, and superior in finish of shrinkage can be obtained.

Further, if a mixed resin containing silicone/acrylic composite rubber (D) at a specified percentage is used, the heat-shrinkable film becomes superior in mechanical characteristics such as heat-shrinkable characteristics, impact resistance and transparency, and superior in finish of shrinkage.

If a film, which has a specified heat-shrinkable percentage and which utilizes a mixed resin containing the 3 components of polylactic acid resin (A), (meth)acrylic resin (B), and rubber component (C), is used as a layer (I), the heat-shrinkable film becomes superior in mechanical characteristics such as heat-shrinkable characteristics, impact resistance and transparency, and superior in finish of shrinkage.

Best Mode for Carrying Out the Invention

The present invention relates to a heat-shrinkable film characterized by comprising a mixed resin containing a polylactic acid resin (A) or having at least 1 layer that is a layer of this mixed resin, and by having a heat shrinkage rate of 20% or more in the film main shrinkage direction when immersed in 80° C. water for 10 seconds.

Of these heat-shrinkable films, a first and a second heat-shrinkable film are films that contain (meth)acrylic resin (B) (and rubber component (C)) in addition to polylactic acid resin (A) as the mixed resin, and the mass ratio of the (meth)acrylic resin (B) (and of the rubber component (C)) to the polylactic acid resin (A) of this mixed resin is within a specified range.

Of these heat-shrinkable films, a third heat-shrinkable film is a film that contains silicone/acrylic composite rubber (D) in addition to polylactic acid resin (A) as the mixed resin, and the mass ratio of the silicone/acrylic composite rubber (D) to this polylactic acid resin (A) is within a specified range.

Of these heat-shrinkable films, a fourth heat-shrinkable film is a heat-shrinkable film related to the present invention as a mixed resin made into a sheet having at least 2 layers of a layer (I) comprising a mixed resin containing (meth)acrylic resin (B) and rubber component (C) in addition to the polylactic acid resin (A), and of a layer (II) having a main component of polylactic acid resin (A).

The first to fourth heat-shrinkable films will be explained below. First, the resins comprising these heat-shrinkable films will be explained.

In the present Description, "contains as a main component" means that it is permissible to contain other components in a range that does not prevent the actions and effects of the resins comprising the various layers (meaning one layer of a single layer body, or layers of a laminated body) forming the respective heat-shrinkable films. Further, although this term is not limited to a concrete content percentage, this component occupies 70 mass % or more of the overall configurational components of the layer, preferably 80 mass % or more, and more preferably, 90 mass % or more.

[Resins Configuring the First to Fourth Heat-Shrinkable Films]
<Polylactic Acid Resin (A)>

In the present invention, polylactic acid resin means monomers of D-lactic acid or L-lactic acid, or copolymers of these, specifically, polylactic acid resins includes poly(D-lactic acid) having structural units of D-lactic acid, poly(L-lactic acid) having structural units of L-lactic acid, poly(DL-lactic acid), which is a copolymer of D-lactic acid and L-lactic acid, mixtures of these.

Moreover, if the polylactic acid resin (A) used in the present invention is a mixture of d-lactic acid and L-lactic acid, the mixture ratio of D-lactic acid and L-lactic acid (abbreviated "D/L ratio" hereinafter), expressed by D-lactic acid/L-lactic acid value, may be 99.8/0.2 or less or 0.2/99.8 or more, preferably 99.5/0.5 or less or 0.5/99.5 or more, more preferably 99/1 or less or 1/99 or more, more preferably 97/3 or less or 3/97 or more, more preferably 95/5 or less or 5/95 or more, and most preferably 92/8 or less or 8/92 or more.

Further, the D/L ratio may be 75/25 or more or 25/75 or less, preferably 85/15 or more or 15/85 or less, more preferably 80/20 or more or 20/80 or less, and even more preferably 90/10 or more or 10/90 or less.

If the D/L ratio is higher than that above, for example, D/L=100/0 (specifically, D-Lactic acid) or 0/100 (specifically, L-lactic acid) extremely high crystallinity is indicated, the melting point is high, and there is a tendency to superior heat resistance and mechanical characteristics. Nonetheless, use as a heat-shrinkable film is normally associated with bag processing using printing and solvents, and therefore it is necessary to suitably lower the crystallinity of the configurational materials as such in order to improve printability and solvent sealing characteristics. If crystallinity is excessively high, orientation crystallization progresses during drawing, and the film shrinkage characteristics when heating are prone to drop. Further, even with film that suppresses crystallization by adjusting the drawing conditions, crystallization advances forward by the heat during heat shrinkage, and as a result, shrinkage shrink marks and insufficient shrinkage are prone to occur. For these reasons, the D/L ratio of the polylactic acid resin used in the present invention is preferably in the above range.

Meanwhile, if the D/L ratio is below the aforementioned lower limit value, crystallization is nearly incomplete, and as a result, problems are prone to arise such as labels fusing together when touching after heat shrinking because of the heat, and a dramatic drop in fracture resistance.

Specifically, if the D/L ratio is the aforementioned upper limit or less a heat shrinkage rate with excellent shrinkage characteristics such as heat shrinking characteristics and finish of shrinkage can be more easily obtained; and if the D/L ratio is the aforementioned lower limit or more, shrinkage shrink marks can be more easily suppressed, and heat shrinking with superior shrinkage characteristics can be obtained.

In the present invention, in order to more easily adjust the D/L ratio of the polylactic acid resin (A), polylactic acid resins with differing copolymer ratios of d-Lactic acid and L-lactic acid can be blended. In this case, the mean value of the copolymerization ratio of the D-lactic acid and L-lactic acid of multiple lactic acid polymers may be set with the aforementioned range. To match the use, two or more polylactic acid resins with differing copolymerization ratios of D-lactic acid and L-lactic acid can be blended, and the heat resistance and heat shrinking characteristics can be balanced by adjusting the crystallinity.

Moreover, the polylactic acid resin (A) used in the present invention may have a main component of a copolymer of the aforementioned L-lactic acid and D-lactic acid, an α-hydroxycarboxylic acid other than lactic acid, and diol, and dicarboxylic acid; or of a copolymer of L-lactic acid and D-lactic acid, an α-hydroxycarboxylic acid other than lactic acid and diol, and dicarboxylic acid.

Here, examples of the "α-hydroxycarboxylic acid" unit to be copolymerized include bifunctional aliphatic hydroxycarboxylic acids such as optical isomers of lactic acid (D-lactic acid for L-lactic acid, L-lactic acid for D-lactic acid), glycolic acid, 3-hydroxybutyric acid, 4-hydroxybutyric acid, 2-hydroxy-n-butyric acid, 2-hydroxy-3,3-dimethylbutyric acid, 2-hydroxy-3-methylbutyric acid, 2-methyllactic acid, and 2-hydroxycaproic acid, and lactones such as caprolactone, bijtyrolactone, and valerolactone.

Examples of the "diols" to be copolymerized include aliphatic diols such as ethylene glycol, 1,4-butanediol, and 1,4-cyclohexanedimethanol, etc. Examples of the "dicarboxylic acid" to be copolymerized include succinic acid, adipic acid, suberic acid, sebacic acid and dodecanedioic acid, and the like.

The copolymer ratio of the copolymer of lactic acid and monomers targeted for copolymerization selected from α-hydroxycarboxylic acid, aliphatic diol and aliphatic dicarboxylic acid is not particularly limited, but a higher percentage occupied by lactic acid is preferable in order to keep the consumption of oil resources low.

Concretely, the copolymer ratio of the lactic acid as the aforementioned lactic acid copolymer and the aforementioned monomers targeted for copolymerization is lactic acid: monomer targeted for copolymerization=95:5 to 10:90, preferably 90:10 to 10:90, more preferably 80:20 to 20:80, and even more preferably 30:70 to 70:30. If the copolymer ratio is within the aforementioned range, a film with an excellent balance of physical characteristics such as rigidity, transparency and impact resistance can be obtained.

Further, the aforementioned lactic acid polymers and aforementioned lactic acid copolymers may be used singly or mixed.

The polylactic acid resin (A) used in the present invention can be prepared by adopting well-known polymerization methods such as condensation polymerization and ring-opening polymerization. For example, if condensation polymerization, polylactic acid resin (A) having an optional composition may be obtained by direct dehydration condensation polymerization of D-lactic acid, L-lactic acid or mixtures of these.

Moreover, in the ring-opening method (lactide method), polylactic acid resin (A) having an optional composition may be obtained by ring-opening polymerization of lactide, which is a cyclic dimer of lactic acid, in the presence of a specified catalyst while using polymerization adjusters as necessary. DL-lactides are dimers of the aforementioned L-lactic acid, and polylactic acid resin (A) having an optional composition and crystallinity can be obtained by mixing and polymerizing these DL-lactides as necessary.

L-lactide, which is a dimer of L-lactic acid, d-lactide, which is a dimer of D-lactic acid, and DL-lactide, which is a dimer of D-lactic acid and L-lactic acid may be cited as the aforementioned lactides. Lactic acid monomers having an optional composition and crystallinity may be obtained by mixing and polymerizing these.

The weight (mass) mean molecular weight of the polylactic acid resin (A) used in the present invention is 20,000 or more, preferably 40,000 or more, more preferably 50,000 or more, more preferably 60,000 or more, and especially preferably 100,000 or more, with an upper limit of 400,000 or less, preferably 350,000 or less, more preferably 300,000 or less, and even more preferably 250,000 or less. If the weight (mass) mean molecular weight is the lower limit value or more, a suitable degree of resin coagulation force can be obtained, insufficient film draw strength or brittleness can be suppressed, and such problems as a drop in mechanical strength can be avoided. Meanwhile, if the weight (mass) mean molecular weight is the upper limit value or less, melting viscosity can be lowered, and this is desirable from the perspective of improving manufacturing characteristics and producibility.

Moreover, the aforementioned polylactic acid resin (A) may contain a small amount of other copolymer components for the purpose of improving heat resistance and the like. For example, aromatic carboxylic acids such as terephthalic acid and aromatic diols such as bisphenol ethylene oxide additives may be cited as these other copolymerization components. In addition, small amounts of acid anhydrides and acid chlorides may also be contained.

If the aforementioned polylactic acid resin (A) has the specified Vicat softening point, then the shrinkage characteristics of the heat-shrinkable film obtained will be satisfactory, which is preferable. It is desirable for the lower limit temperature of this Vicat softening point to be 50° C. or more, preferably 55° C. or more, and it is desirable for the upper limit temperature to be 95° C. or less, preferably 85° C. or less.

If the lower limit temperature of this Vicat softening point is 50° C. or more, natural shrinkage can be suppressed. Meanwhile, if the upper limit temperature is 95° C. or less, the film can be drawn at a low temperature, and satisfactory shrinkage characteristics can be imparted to the drawn film.

"Nature Works" (manufactured by Cargill Dow), and "LACEA" (manufactured by Mitsui Chemical (Co., Ltd.)) may be cited as examples of commercial products of the aforementioned polylactic acid resins.

<(Meth)acrylic Resin (B)>

Next, (meth)acrylic resin (B) will be explained. Because of its compatibility with polylactic acid resin (A), blending (meth)acrylic resin (B) with polylactic acid resin (A) can adjust the glass transition temperature, which has an effect on the shrinkage characteristics, and therefore (meth)acrylic resin (B) is a resin effective for improving the finish of shrinkage. Further, in the present Description "(meth)acrylic" means "acrylic or methacrylic".

The (meth)acrylic resin (B) used in the present invention is methyl methacrylate monomer, or a copolymer of methyl (meth)acrylate and other vinyl monomers. Examples of said other vinyl monomers include (meth)acrylate esters such as ethyl (meth)acrylate, butyl (meth)acrylate, cyclohexyl (meth)acrylate, phenyl (meth)acrylate, benzyl (meth)acrylate, (meth)acrylate-2-ethylhexyl, and (meth)acrylate-2-hydroxyethyl; unsaturated acids such as (meth)acrylate, styrene, α-methyl styrene, acrylonitrile, methacrylonitrile, anhydrous maleic acid, phenylmaleimide, cyclohexylmaleimide, and the like.

Moreover, elastomer components such as polybutadiene or butadiene/butyl (meth)acrylate copolymer and butyl poly (meth)acrylate copolymer, and anhydrous glutaric acid units and glutamide units may also be included in these copolymers. From the perspective of rigidity and moldability, two or more copolymers selected from polymethyl methacrylate (PMMA), which is a monomer of methyl methacrylate, methyl (meth)acrylate, ethyl (meth)acrylate, butyl (meth)acrylate, and groups comprising (meth)acrylate may be suitably used. Specifically, when polymethyl methacrylate (PMMA) is blended, the glass transition point of (meth)acrylic resin (B) can be heightened, and as a result, a sudden beginning to shrinkage is mitigated at the time of shrinkage, and this is preferable because a satisfactory finish of shrinkage can be obtained.

The weight (mass) mean molecular weight of the (meth)acrylic resin (B) used in the present invention is 20,000 or more, preferably 40,000 or more, and more preferably 60,000 or more; and is 400,000 or less, preferably 350,000 or less, and more preferably 300,000 or less.

If the weight (mass) mean molecular weight of the (meth)acrylic resin (B) is 20,000 or more, it is possible to suppress inadequate film draw strength and brittleness. Meanwhile, if the weight (mass) mean molecular weight of the (meth)acrylic resin (B) is 400,000 or less, the fusion viscosity can be lowered, which is preferable from the perspective of improving manufacturing characteristics and producibility.

"Sumipex (manufactured by Sumitomo Chemical (Co., Ltd.)), "Acrylpet (manufactured by Mitsubishi Rayon (Co., Ltd.)), "Parapet (manufactured by Kuraray (Co., Ltd.)), "Artuglass" (manufactured by Atofina Japan (Co., Ltd.)), and "Derupet" (manufactured by Asahi Kasei Chemicals (Co., Ltd.)) may be cited as examples of commercial products of the aforementioned (meth)acrylic resin (B).

<Rubber Component (C)>

The rubber component (C) used in the present invention means a rubber component, excluding polylactic acid resin (A), for the purpose of improving the impact resistance of the film obtained from mixing the aforementioned resins polylactic acid resin (A) and (meth)acrylic resin (B), and is preferably contained in a range wherein the film does not lose heat shrinkage characteristics and rigidity.

Copolymers of lactic acids other than the aforementioned polylactic acid resin (A), aliphatic polyesters, aromatic aliphatic polyesters, aromatic polyesters, copolymers of diols, dicarboxylic acid and the aforementioned lactic acid monomers, core-shell structured rubbers, ethylene-vinyl acetate copolymer (EVA), ethylene-(meth)acrylate copolymer (EAA, etc.), ethylene-ethyl acrylate copolymer (EEA), and ethylene-methyl (meth)acrylate copolymer (EMMA) may be cited as concrete examples of the aforementioned rubber component (C). Preferably, core-shell structured rubbers are suitably used.

Polyhydroxycarboxylic acid, aliphatic polyesters obtained by condensing aliphatic diols and aliphatic dicarboxylic acid, aliphatic polyesters obtained by ring-opening polymerization of cyclic lactones, and synthetic aliphatic polyesters may be cited as examples of the aforementioned aliphatic polyesters.

3-Hydroxy butyric acid, 4-hydroxy butyric acid, 2-hydroxy-n-butyric acid, 2-hydroxy-3,3-dimethyl butyric acid, 2-hydroxy-3-methyl butyric acid, 2-methyl lactic acid, and 2-hydroxy caprolactonic acid may be cited as examples of the aforementioned polyhydroxy carboxylic acids.

Polymers that can be obtained as the desired macromolecules by condensing 1 or 2 or more kinds respectively from aliphatic diols and aliphatic dicarboxylic acid, which will be explained next, or by jumping up the molecular weight with isocyanate compounds and the like as necessary may be cited as the aforementioned aliphatic polyester obtained by condensing aliphatic diol and aliphatic dicarboxylic acid.

Compounds obtained from condensation polymerization by selecting 1 or more kinds respectively from among: aliphatic diols or anhydrides or derivatives thereof such as ethylene glycol, propylene glycol, 1,4-butane diol, hexane diol, octane diol, cyclopentane diol, cyclohexane diol, and 1,4-cyclohexane methanol; and aliphatic dicarboxylic acid or anhydrides or derivatives thereof such as succinic acid, adipic acid, suberic acid, sebacic acid, and dodecanedioic acid may be cited as the aforementioned aliphatic polyesters obtained by condensing aliphatic diol and aliphatic dicarboxylic acid. At this time, the desired polymer may be obtained by lengthening the chain with isocyanate compounds and the like as necessary. Commercially available products such as "Bionolle" (manufactured by Showa Highpolymer (Co., Ltd.)), "Plamate" (commercial name, manufactured by Dainippon Ink & Chemicals Inc.), and "GS-PLA" (commercial name, manufactured by Mitsubishi Chemical (Co., Ltd.)) may be cited as examples of the aforementioned aliphatic polyesters.

One or more selected from ε-caprolactone, δ-caprolactone, and β-methyl-8 valerolactone and the like polymerized as a cyclic monomer may be cited as the aforementioned aliphatic polyesters in which cyclic lactones have undergone ring-opening polymerization. Moreover, a copolymer of a cyclic acid anhydride such as succinic acid anhydride and an oxirane such as ethylene oxide and propylene oxide may be cited as the aforementioned synthetic group aliphatic polyesters. Concretely, "Cellgreen" (commercial name, manufactured by Daicel Chemical Industries (Co., Ltd.)), and "Tone Polymer" (commercial name, manufactured by Union Carbide Japan (Co., Ltd.)) are commercially available.

Next, substances that lower the crystallinity by introducing an aromatic ring between aliphatic chains may be used as aromatic aliphatic polyesters. Substances in which aromatic carboxylic acid, aliphatic carboxylic acid, and aliphatic diols have been condensed, and substances in which aliphatic diols or derivatives thereof, or aromatic diols or derivatives thereof, and aliphatic carboxylic acids or derivatives thereof have been condensed may be cited as examples of aromatic aliphatic polyesters.

Isophthalic acid, terephthalic acid, 2,6-naphalene dicarboxylic acid, paraphenyl carboxylic acid and the like may be cited as the aforementioned aromatic dicarboxylic acid, and terephthalic acid is most suitable used.

Moreover, succinic acid, adipic acid, suberic acid, sebacic acid and dodecanedioic acid, and the like may be cited as aliphatic dicarboxylic acid, and adipic acid is most suitably used.

Further, the previously described substances may be cited as the aliphatic diols. Moreover, bisphenol A ethylene oxide additives and the like may be cited as aromatic diols.

Further, 2 or more kinds of aromatic dicarboxylic acid, aliphatic dicarboxylic acid or aliphatic diol may be used respectively.

Copolymers of tetramethylene adipate and terephthalate, and copolymers of polybutylene adipate and terephthalate may be cited as representative examples of the aforementioned aromatic aliphatic polyesters. Easter Bio (manufactured by Eastman Chemicals) is commercially available as a copolymer of tetramethylene adipate and terephthalate, and Ecoflex (manufactured by GASF) is commercially available as a copolymer of polybutylene adipate and terephthalate.

Random copolymers, block copolymers, and graft copolymers may be cited as the structures of the aforementioned copolymers of diols and dicarboxylic acid and polylactic acid resin, and any structure may be used. However, from the perspective of impact resistance and transparency, block copolymers and graft copolymers are preferable. "GS-Pla" (commercial name, manufactured by Mitsubishi Chemical (Co., Ltd.)) may be cited as a concrete example of a random copolymer, and "Plamete" (commercial name, manufactured by Dainippon Ink & Chemicals, Inc.) may be cited as a concrete example of a block copolymer or graft copolymer.

The method of manufacturing the aforementioned copolymer of polylactic acid resin, diol and dicarboxylic acid is not particularly limited, and examples include methods that submit a polyester or polyester polyol, having a structure in which the diol and dicarboxylic acid have undergone dehydration condensation, to ring-opening polymerization or ester substitution reaction with a lactide. Moreover, a polyester or polyester polyol having a structure in which the diol and dicarboxylic acid have undergone dehydration condensation may be submitted to a dehydration/deglycolation condensation or ester substitution reaction with polylactic acid resin.

It is desirable that the weight mean molecular weight of the lactic acid resin other than the polylactic acid resin (A) copolymer used as the aforementioned rubber component (C), aliphatic polyester, aromatic aliphatic polyester, and aromatic polyester has a range within a lower limit value of 50,000 or more, preferably 100,000 or more, and an upper limit value of 400,000 or less, preferably 300,000 or less, and more preferably 250,000 or less. If the lower limit value is 50,000 or more, such problems as the deterioration of mechanical strength are not prone to occur. On the other hand, if the upper limit value is 400,000 or less, the fusion viscosity can be lowered, which is desirable from the perspective of manufacturing characteristics and producibility.

The aforementioned core-shell structure means a rubber component having a multi-layer structure of 2 or more layers with a core part and a shell part. This core shell structural rubber can dramatically improve the impact resistance without losing hardly any transparency of the lactic acid resin because of ultrafine dispersion in the component (A) is achieved by making a composite with the component (A), which has an effect to improve impact resistance.

Gel group core-shell copolymers such as methacrylate-butadiene copolymer and acrylonitrile-butadiene-styrene copolymer, and acrylic group core-shell copolymers such as methacrylate-styrene-acrylonitrile copolymers may be cited as the aforementioned core-shell structural rubber. Of these, silicone-methacrylate-methyl methacrylate, which has excellent compatibility with polylactic acid resin and has balanced film impact resistance and transparency, is most suitably used. Concretely, "Metabulene C, E, and W." (manufactured by Mitsui Rayon (Co., Ltd.)) and "Kaneace" (manufactured by Kaneka) are commercially available.

Other than ethylene, the co-monomer content as the aforementioned ethylene-vinyl acid copolymer (EVA), ethylene-acrylic acid copolymer (EAA), ethylene-(meth)acrylic acid copolymer (EMA), and ethylene-methyl (methacrylate) copolymer (EMMA) is suitably 10 mass % or more, preferably 20 mass % or more, and more preferably 40 mass % or more; and is 90 mass % or less, preferably 80 mass % or less, and more preferably 70 mass % or less, and most preferably 60 mass % or less. If the content of the co-monomer other than ethylene is 10 mass % or more, a sufficient effect to improve film fracture resistance is obtained while transparency can be maintained. If 90 mass % or less, a satisfactory overall film rigidity and thermal resistance can be maintained. Of these, ethylene-vinyl acetate (EVA) is most suitably used.

"EVAFLEX" (commercial name, manufactured by Mitsui DuPont Polychemicals (Co., Ltd.)), "Novatec EVA" (commercial name, manufactured by Mitsubishi Chemical (Co., Ltd.)), "Evaslene" (commercial name, manufactured by Dainippon Ink & Chemicals, Inc.), "Evatate" (commercial name, manufactured by Sumitomo Chemicals (Co., Ltd.)), and "Soabrene" (commercial name, manufactured by Nippon Gohsei Kagaku (Co., Ltd.)), etc. are commercially available as the aforementioned ethylene-acrylic acid copolymers (EAA).

"Novatec EAA" (commercial name, manufactured by Mitsubishi Chemical (Co., Ltd.)), etc. is commercially available as the aforementioned ethylene-acrylic acid copolymer (EAA). Further, "Noafloi AC" (commercial name, manufactured by Mitsui DuPont Polychemicals (Co., Ltd.)), etc. is commercially available as an ethylene-(meth)acrylate copolymer (EMA). Further, "Akulift" (commercial name, manufactured by Sumitomo Chemical (Co., Ltd.)), etc. is commercially available as an ethylene-methyl (meth)acrylate copolymer (EMMA).

<Silicone/Acrylic Composite Rubber (D)>

Next, the aforementioned silicone/acrylic composite rubber (D) will be explained. This silicone/acrylic composite rubber (D) is compounded in order to improve the impact resistance of the polylactic acid resin (A). In addition to having superior low temperature characteristics, this silicone/acrylic composite rubber (D) has a strong effect to improve impact resistance and can dramatically improve impact resistance without losing hardly any transparency of the lactic acid resin because making a composite with an acryl group brings about ultrafine dispersion in the polylactic acid resin (A).

This silicone/acrylic composite rubber (D) has a core-shell structure. Concrete examples include a core part comprising a copolymer of a siloxane compound and a (meth)acrylic monomer; and a shell part comprising a monomer or copolymer of (meth)acrylic monomer.

Dimethyl siloxane and the like may be cited as the aforementioned siloxane compound. Moreover, butyl (meth)acrylate, and 2-ethylhexyl acrylate and the like may be cited as the (meth)acrylic monomer used in the core part. Further, methyl (meth)acrylate and the like may be cited as the (meth)acrylic monomer used in the shell part.

When using the silicone/acrylic composite rubber having the aforementioned core-shell structure, there is a polymer comprising (meth)acrylic monomer in the shell part, and therefore the affinity with the (meth)acrylic monomer in the core part is high and the affinity with the polylactic acid resin arranged on the exterior of the silicone/acrylic composite is high. For that reason, this core-shell structure of the aforementioned silicone/acrylic composite rubber can be present in a stable manner, and a steady state of dispersion can be maintained within the aforementioned mixed resin.

Metablene S-2001, manufactured by Mitsubishi Rayon (Co., Ltd.) may be cited as a concrete example of the aforementioned silicone/acrylic composite rubber.

<Glass Transition Temperature (Tg)>

The glass transition temperature of the mixed resin containing the polylactic acid resin used in the present invention can be shifted to a higher temperature region than that when using polylactic acid resin alone. Concretely, the Tg of the mixed resin containing the polylactic acid resin (A) used in the present invention is 40° C. or more, preferably 45° or more, and more preferably 50° C. or more; and is 100° C. or less, preferably 90° C. or less, and more preferably 85° C. or less. If the Tg is 40° C. or more, natural condensation can be suppressed; and if the Tg is 100° C. or less, drawing at low temperature is possible and sufficient shrinkage characteristics can be obtained. In addition to the method of using the polylactic acid resin (A) stipulated in the present invention, for example, mixing the stipulated amount of the (meth) acrylic resin (B) is a method to adjust the Tg to within the aforementioned range. The Tg of the mixed resin can, for example, be measured using a differential scanning calorimeter (DSC).

<Other Added Components>

At least one or more kinds of the following thermoplastic resins (called "other thermoplastic resins" hereinafter) may be further contained in the present invention in a range wherein there is no notable loss of the effect of this invention: polyethylene resins, polypropylene resins, polystyrene resins (general purpose polystyrene (GPPS), rubber modified impact resistant polystyrene (HIPS), polystyrene-polybutadiene-polystyrene block copolymer (SBS), polystyrene-polyisoprene-polystyrene block copolymer (SIS), polystyrene-poly(ethylene/butylene) block-polystyrene copolymer (SEBS), polystyrene-poly (ethylene/propylene) block copolymer (SE PS), polystyrene-ply(ethylene-ethylene/propylene) block-polystyrene copolymer (SEEPS), styrene-carboxylic acid copolymer, and the like), polyamide resins, and polyoxymethylene resins.

Moreover, plasticizers may be added to the present invention as necessary in a range wherein there is no notable loss of the effect of this invention for the purpose of improving impact resistance, transparency, molding process characteristics and the overall characteristics as a heat-shrinkable film. Aliphatic ester plasticizers, phthalate ester plasticizers, trimellitic acid ester plasticizers and the like may be cited as these plasticizers.

Dibutyl adipate, diisobutyl adipate, diisononyl adipate, diisodecyl adipate, di(2-ethylhexyl) adipate, di(n-octyl) adipate, di(n-decyl(adipate, dibutyl diglycol adipate, dibutyl sebacate, di(2-ethylhexyl) sebacate, di(n-hexyl) azelate, di(2-ethylhexyl) azelate, di(2-ethylhexyl) dodecan dieonate, and the like may be cited as concrete examples of the aforementioned aliphatic ester plasticizers.

Moreover, diisononyl phthalate, diisodecyl phthalate, di(2-ethylhexyl) phthalate, and the like may be cited as concrete examples of the aforementioned phthalate ester plasticizers. Further, tri(2-ethylhexyl) trimellitate and the like may be cited as concrete examples of the aforementioned trimellitic acid ester plasticizers.

In addition to the aforementioned thermoplastic resins and plasticizers, additives (called "various other additives" hereinafter) may be added as necessary in a range wherein there is no notable loss of the effect of this invention for the purpose of improving and adjusting the molding process characteristics, productivity, and physical characteristics of the heat-shrinkable film. Examples include recycled resins generated from the trimming loss at the ends of the film and the like; inorganic particles such as silica, talc, kaolin, and calcium carbonate; pigments such as titanium oxide, and carbon black; fire retardants, weathering stabilizers, heat stabilizers, antistatic agents, solvent viscosity improvers, bridging agents, lubricants, nucleators, and anti-aging agents.

[Heat-Shrinkable Films]

Next, first to fourth heat-shrinkable films will be explained respectively. In the present Description, "film main shrinkage direction" means whichever of the longitudinal (lengthwise) direction or transverse (widthwise) direction has the greater heat shrinkage rate, for example, if fitted to a bottle, the direction equivalent to that circumferential direction; and "film orthogonal direction" means the direction orthogonal to the main shririkage direction.

<Heat Shrinkage Rate>

The heat shrinkage rates of the first to fourth heat-shrinkable films are indices to judge the applicability to a shrinkage processing step of a comparatively short time (several seconds to about 10 seconds) in such uses as PET bottle shrinkable labels. Currently, the shrinkage processing equipment most often used industrially for fitting PET bottle with labels is generally called a steam shrinker, and uses steam as the thermal medium to conduct the shrinkage process. Further, it is necessary for the heat-shrinkable film to undergo sufficient heat shrinkage at as low a temperature as possible in terms of the affect of the heat on the covered object. Nonetheless, if the layers have extremely different heat shrinkage rates based on temperature, the higher the temperature dependence, the more prone the film is to shrinkage shrink marks, wrinkles and blisters, and to a poorer finish of shrinkage and appearance.

From the perspective of industrial productivity, in order to have a sufficiently close fit to the covered object within the shrinkage processing time and to obtain a satisfactory finish of shrinkage appearance without producing shrink marks, wrinkles and blisters, it is preferable that the heat shrinkage rate in the film main shrinkage direction when immersing for 10 seconds in 80° C. water be 20% or more.

Moreover, if the film of the present invention is used as a heat-shrinkable label, the heat shrinkage rate orthogonal to the film main shrinkage direction when immersed in 80° C. water for 10 minutes is 10% or less, preferably 5% or less, and more preferably 3% or less. It is preferable that the heat shrinkage rate orthogonal to the film main shrinkage direction when immersed in 80° C. water for 10 minutes be 10% or less because problems are less likely to occur such as shortening of the dimension orthogonal to the film main shrinkage direction after shrinkage, distortion of the printed design and lettering after shrinkage, and longitudinal pulling when a square shouldered bottle is used.

<First Heat-Shrinkable Film>

A first heat-shrinkable film of the present invention (called "first film" hereinafter) is a film comprising a mixed resin layer of polylactic acid resin (A) and (meth)acrylic resin (B), and has at least 1 layer of this mixed resin drawn uniaxially.

(Mixture ratio of polylactic acid resin (A) and (meth)acrylic resin (B)) It is important that the mixed resin that will be the main component of the mixed resin layer comprising the first film have a mass ratio of polylactic acid resin (A) and (meth)acrylic resin (B) within the range of (A)/(B)=95/5 to 50/50. If the content percentage of (meth)acrylic resin (B) to the total mass (100 mass %) of the mixed resin is 5 mass % or more, the effects of improving the shrinkage characteristics, finish of shrinkage, and transparency of the film can be fully obtained. Meanwhile, a (meth)acrylic resin (B) content percentage of 50 mass % or less is preferable because the draw characteristics can be maintained at low temperature without a notable drop in the impact resistance of the film, and a sufficient heat shrinkage rate can be fully obtained in a practical temperature range (about 70° C. to 90° C.). More preferably, the mixed resin used in the present invention has a mass ratio of the polylactic acid resin (A) and (meth)acrylic resin (B) in the range of (A)/(B)=90/10 to 60/40.

(Amount of Rubber Component (C) Added)

Moreover, the aforementioned rubber component (C) may be added to the first film. The amount of this rubber component (C) added in relation to the total mixed resin of polylactic acid resin (A) and (meth)acrylic resin (B) is 3 mass % or more, preferably 9 mass % or more, more preferably 13 mass % or more, and even more preferably 16 mass % or more; and is 45 mass % or less, preferably 43 mass % or less, and more preferably 41 mass % or less. If the amount of rubber component (C) added is 3 mass % or more and 45 mass % or less, the film may be suitably used for heat-shrinkable labels without losing film rigidity and transparency.

(Other Components)

Further, the aforementioned other added components may be included in the first film as necessary.

(Layer Configuration)

The configuration of the first film may be a single layer, or the configuration may be a laminate for the purpose of adding surface function characteristics to the film such as sliding characteristics, flame resistance, solvent resistance, and ease of bonding. For example, if layers (II) and (III) are laminated on layer (I), which has the main components of polylactic acid resin (A) and (meth)acrylic resin (B), the lamination configuration may include (I)/(II), (II)/(I)/(II), (II)/(I)/(III), (II)/(I)/(III)/(II), and the like. Moreover, the lamination ratio of the various layers may be arranged at the applicable time corresponding to the use and purpose.

(Thickness)

There are no particular limits to the overall thickness of the first film, but thinner is preferable from the perspective of transparency, shrink processing characteristics, source material costs, and the like. Concretely, the overall thickness of the film after drawing is 80 μm or less, preferably 70 μm or less, more preferably 50 μm or less, and even more preferably 40 μm or less. Moreover, there are no particular limits to the lower limit of the film, but 20 μm or more is preferable considering the handling characteristics of the film.

(ΔHm and ΔHc)

In the first film, it is important that the difference [ΔHm−ΔHc] between ΔHm, which is the amount of heat necessary to melt all the crystals contained in the film when heated at a heating velocity of 10° C./min from −40° C. to 250° C. using a differential scanning calorimeter (DSC), and ΔHc, which is the amount of heat produced by crystallization during heat measurement, be adjusted to the range of 25 J/g or less, more preferably 20 J/g or less preferably 15 J/g or less, and most preferably 10 J/g or less.

Here, ΔHm is the amount of heat necessary to melt all the crystals contained in the film when heated at a heating velocity of 10° C./min from −40° C. to 250° C. using a differential scanning calorimeter (DSC), and is the scale indicating the extent of film crystallization, but the effect of crystallization produced during heat measurement is also included. Thus, the extent of crystallization of the original film can be known by subtracting ΔHc, which is the amount of crystallization heat originating in crystallization during heat measurement. If the amount of (ΔHm−ΔHc) is 25 J/g or less, crystallization by heat shrinkage can be sufficiently controlled, which is preferable in practical terms because the film can be readily adjusted to within the heat shrinkage range, and the mechanical strength of the film is not likely to drop over time. Further, if the first film has a laminated structure, it is best for the (ΔHm−ΔHc) of all layers of the film to be in the aforementioned range, and from the perspective of heat resistance and solvent resistance, it is preferable to adjust the surface layer to more or less heighten crystallization.

(Heat Shrinkage Rate)

As described above, it is important that the heat shrinkage rate of the first film in the film main shrinkage direction when immersing in 80° C. water for 10 seconds be 20% or more, preferably 25% or more, and more preferably 30% or more. In addition, the upper limit is preferably 65%.

It is preferable that the heat shrinkage of the first film in the film main shrinkage direction when immersing in 60° C. water for 10 seconds be 25% or less. Then, the difference between the heat shrinkage rate in the main shrinkage direction when immersing in 80° C. water for 10 seconds is 20% or more and 70% or less, preferably 20% or more and 60% or less, and more preferably 20% or more and 50% or less.

In order to bring the film heat shrinkage rate of the first film into the aforementioned range, it is important to adjust the mixture rate of the mixed resins that configure the film and/or the (ΔHm−ΔHc) within the range stipulated for the first film, but it is possible to make further adjustments by controlling the draw ratio in the range of 2 times or more and 10 times or less, the draw temperature in the range of 60° C. or more and 110° C. or less, and the heat processing temperature in the range of 60° C. or more and 100° C. or less.

(Elastic Modulus)

The elastic modulus orthogonal to the film main shrinkage direction of the first film bias (rigidity at room temperature) is preferably 1,200 MPa or more, more preferably 1,400 MPa or more, and more preferably 1,600 MPa or more. Moreover, the upper limit of the elastic modulus of the heat-shrinkable film normally used is about 3,000 MPa, preferably about 2,900 MPa, and more preferably about 2,800 MPa. If the elastic modulus orthogonal to the film main shrinkage direction is 1,200 MPa or more, the bias (rigidity at room temperature) of the film as a whole can be heightened, and in particular, if the film is thin, when covering a container with a film made into a bag for a container such as a PET bottle, problems that are prone to lower the yield such as covering at a slant and folding along the bias are less likely to occur, which is preferable. Further, in the present invention, the film main shrinkage direction means whichever of the longitudinal or transverse direction that has the larger draw, and for example, is equivalent to the peripheral direction if fitted to a PET bottle.

(Transparency)

When measuring a film with, for example, a thickness of 50 μm based on JIS K7105 standards, the transparency of the first film has a film haze value of 10% or less, preferably 7% or less, and more preferably 5% or less. If the haze value is 10% or less, the film is transparent and can manifest a display effect.

(Impact Resistance)

When evaluating the impact resistance of the first film based on the elongation percentage after tensile fracture using tension tests conducted in a 0° C. environment, the elongation percentage in the machine (flow) direction (MD), particularly when used as labels, is 100% or more, preferably 150% or more, and more preferably 200% or more. If the elongation percentage after tensile fracture conducted in a 0° C. environment is 100% or more, the problems of film breakage during such processing steps as printing and making bags are unlikely to occur, which is preferable. Moreover, if the elongation percentage after tensile fracture is 100% or more, breakage will be unlikely even when increasing tensile force on the film in conjunction with speeding up the processes of printing and making bags, which is preferable.

(Manufacturing Method)

Well-known methods may be used to manufacture the first film. The shape of the film may be either flat or tubular, but flat is preferable from the perspective of producibility (ability to make a product of several sheets of whole film in the width direction) and the ability to print on the inner surface. Melting the resins using multiple extruders, co-extruding from a T die, cooling and hardening with a chilled roll, longitudinal roll drawing, transverse tenter drawing, annealing, cooling, (corona discharge surface processing, if necessary,) and winding using a winder to obtain a film may, for example, be cited as a method to manufacture the film. Moreover, making a flat shape by cutting a film produced by a tube manufacturing method is also possible.

In uses having shrinkage in two directions such as overwrapping, the draw ratio is about 2 times or more and 10 times or less longitudinally and 2 times or more and 10 times or less transversely, and preferably about 3 times or more and 6 times or less longitudinally and 3 times or more and 6 times or less transversely. Meanwhile, in uses having shrinkage mainly in one direction such heat-shrinkable labels, the draw ratio is 2 times or more and 10 times or less in the direction equivalent to the main direction of shrinkage, preferably 4 times or more and 8 times or less, and orthogonally to that direction, 1 time or more and 2 times or less (1 time indicates that it is not been drawn), preferably 1.1 times or more and 1.5 times or less, and selection of a ratio that is substantially in the category of a uniaxial draw is desirable. A biaxially drawn film, which has been elongated with a draw ratio in the aforementioned range and does not have too large of a heat shrinkage rate orthogonally to the main shrinkage direction, is preferable when used, for example, as a heat-shrinkable label because the film heat shrinks in the height direction of the container when affixed to the container, and can suppress the so-called longitudinal pull phenomenon.

It is necessary to vary the draw temperature depending on the glass transition temperature of the resin used and the characteristics required for the heat-shrinkable film, but the temperature is roughly controlled in the range of a lower limit of 60° C. or more, preferably 70° C. or more, and an upper limit of 100° C. or less, preferably 90° C. or less. Moreover, the draw ratio corresponds to the characteristics of the resin used, the draw means, draw temperature, shape of the target product, and the like, and is suitably determined in a uniaxial or biaxial direction in the range of 1.5 times or more and 10 times or less in the main shrinkage direction, preferably 3 times or more and 7 times or less, and more preferably 3 times or more and 5 times or less. In addition, even when a uniaxial transverse draw is used, it is effective to also have a slight draw of about 1.05 times or more and 1.8 times or less longitudinally for the purpose of improving the mechanical properties of the film. Next, after the drawn film has undergone heat treatment at a temperature of about 50° C. or more and 100° C. or less and then relaxation treatment as necessary in order to decrease the natural shrinkage rate and to improve the heat shrinkage characteristics and the like, rapidly cooling is conducted within a time that does not relax the molecular orientation, and a heat-shrinkable film is obtained.

Moreover, the first film may be further subjected to surface treatment and surface processing such as corona processing, printing, coating, and vapor deposition, as well as to bag production by using various solvents or heat sealing, and to perforation processing and the like.

The first film is processed into shapes from flat to cylindrical depending on the object to be packaged, and is then provided for packaging. If printing is required for a cylindrical container such as a PET bottle, first the required image may be printed on one surface of a wide flat film that is wrapped around a roller, and then the necessary width is cut and the film is made into a cylindrical shape by folding back with the printed surface to the inside and sealing the center (the sealed part uses a so-called envelope seal). The center may be sealed by bonding using an organic solvent, heat sealing, use of an adhesive, or impulse sealing. Of these, bonding using an organic solvent is preferable from the perspective of producibility and appearance.

<Second Heat-Shrinkable Film>

A second heat-shrinkable film of the present invention (called "second film" hereinafter) is a film comprising a mixed resin layer of polylactic acid resin (A) and (meth) acrylic resin (B), and has at least 1 layer of this mixed resin drawn uniaxially.

(Mixture ratio of polylactic acid resin (A) and (meth) acrylic resin (B)) The mixed resin of the second film has a mass ratio of polylactic acid resin (A) and (meth)acrylic resin (B) within the range of (A)/(B)=91/9 or less, preferably 83/17 or less, and more preferably 77/23 or less; and of 33/67 or more, preferably 64/36 or more, and more preferably 62/38 or more. If the content percentage of (meth)acrylic resin (B) is greater than the minimum of the aforementioned range, the effects of improving the shrinkage characteristics, finish of shrinkage, and transparency of the film can be obtained. Meanwhile, if the content is less than the maximum of the aforementioned range, the draw characteristics at low temperature can be maintained without a notable drop in the impact resistance of the film, and a sufficient heat shrinkage rate can be obtained in a practical temperature range (about 70° C. to 90° C.).

Note: The original description had errors. Please correct the errors to the above-mentioned notation in the after prosecution.

(Amount of Rubber Component (C) Added)

Moreover, the aforementioned rubber component (C) may be added to the second film. The amount of this rubber component (C) added in relation to the total mixed resin of polylactic acid resin (A) and (meth)acrylic resin (B) is 3 mass % or more, preferably 9 mass % or more, more preferably 13 mass % or more, and even more preferably 16 mass % or more; and is 45 mass % or less, preferably 43 mass % or less, and more preferably 41 mass % or less. If the amount of rubber component (C) added is 3 mass % or more and 45 mass % or less, the film may be suitably used for heat-shrinkable labels without losing film rigidity and transparency.

(Other Components)

Further, the aforementioned other added components may be included in the second film as necessary.

(Layer Configuration)

The configuration of the second film may be a single layer, or the configuration may be a laminate for the purpose of adding surface function characteristics to the film such as sliding characteristics, flame resistance, solvent resistance, and ease of bonding. For example, if layers (II) and (III) are laminated on layer (I), which has the main components of polylactic acid resin (A), (meth)acrylic resin (B) and rubber component (C), the lamination configuration may include a 2-layer structure of (I)/(II), a 3-layer structure of (II)/(I)/(II) or (II)/(I)/(III), or a 4-layer structure (II)/(I)/(III)/(II) and the like. Moreover, the percentage of laminate thickness of the various layers may be optionally set corresponding to the use and purpose.

(Thickness)

There are no particular limits to the overall thickness of the second film, but thinner is preferable from the perspective of transparency, shrink processing characteristics, source material costs, and the like. Concretely, the overall thickness of the film after drawing is 80 μm or less, preferably 70 μm or less, and more preferably 50 μm or less. Moreover, there are no particular limits to the lower limit of the film, but 20 μm or more is preferable considering the handling characteristics of the film.

(Manufacturing Method)

Well-known methods may be used to manufacture the second film. The shape of the film may be either flat or tubular. A flat shaped film is preferable because a product can be made with several sheets of whole film in the width direction, and the inside surface can be printed. For example, in the manufacturing method of a flat film, the resins are melted using multiple extruders, co-extruded from a T die, and cooled and hardened using a chilled roll. Next, longitudinal roll drawing, transverse tenter drawing, annealing, cooling, (corona discharge surface processing, if necessary,) and winding using a winder are conducted. Moreover, making a flat shape by cutting a film produced by a tube manufacturing method is also possible.

In uses having shrinkage in two directions such as overwrapping, the draw ratio is about 2 times or more and 10 times or less longitudinally and 2 times or more and 10 times or less transversely, and preferably about 3 times or more and 6 times or less longitudinally and 3 times or more and 6 times or less transversely. A biaxially drawn film that is drawn at a draw ratio within this range does not have too large of a heat shrinkage rate orthogonally to the main shrinkage direction, and for example, if used for heat-shrinkable labels, the film heat shrinks in the height direction of the container when fitted to the container. So-called longitudinal pull phenomenon may be suppressed. Meanwhile, in uses having shrinkage mainly in one direction such heat-shrinkable labels, the draw ratio is 2 times or more and 10 times or less in the direction equivalent to the main direction of shrinkage, preferably 4 times or more and 8 times or less, and orthogonally to that direction, 1 time or more and 2 times or less (1 time indicates that it is not been drawn), preferably 1.01 times or more and 1.5 times or less, and selection of a draw ratio that is substantially in the category of a uniaxial draw is preferable.

It is necessary to vary the draw temperature depending on the glass transition temperature of the resin used and the characteristics required for the heat-shrinkable film, but the temperature is roughly controlled in the range of a lower limit of 60° C. or more, preferably 70° C. or more, and an upper limit of 100° C. or less, preferably 90° C. or less. Meanwhile, the draw ratio must be adjusted corresponding to the characteristics of the resins contained, the draw means, draw temperature, shape of the target product, and the like, and is Suitably determined in a uniaxial or biaxial direction in the range of 1.5 times or more and 10 times or less in the main shrinkage direction, preferably 3 times or more and 7 times or less, and more preferably 3 times or more and 5 times or less. In addition, even when a uniaxial transverse draw is used, it is effective to also have a slight draw of about 1.05 times or more and 1.8 times or less longitudinally for the purpose of improving the mechanical properties of the film.

Next, after the drawn film has undergone heat treatment at a temperature of about 50° C. or more and 100° C. or less and then relaxation treatment as necessary in order to decrease the natural shrinkage rate and to improve the heat shrinkage characteristics and the like, rapidly cooling is conducted within a time that does not relax the molecular orientation, and a heat-shrinkable film is obtained. The second film may be further subjected to surface treatment and surface processing such as corona processing, printing, coating, and vapor deposition, as well as to bag production by using various solvents or heat sealing, and to perforation processing and the like.

The second film is processed into shapes from flat to cylindrical depending on the object to be packaged, and is then provided for packaging. If printing is required for a cylindrical container such as a PET bottle, first the required image may be printed on one surface of a wide flat film that is wrapped around a roller, and then the necessary width is cut and the film is made into a cylindrical shape by folding back with the printed surface to the inside and sealing the center (the sealed part uses a so-called envelope seal). The center may be sealed by bonding using an organic solvent, heat sealing, use of an adhesive, or impulse sealing. Of these, bonding using an organic solvent is preferable from the perspective of producibility and appearance.

(Heat Shrinkage Rate)

As described above, the lower limit of the heat shrinkage rate of the second film in the film main shrinkage direction when immersing in 80° C. water for 10 seconds may be 20% or more, but 30% or more is preferable, and the upper limit value may be 70 or less, but 65% or less is preferable. Generally, it is necessary for a heat-shrinkable film to have sufficient heat shrinkage at as low a temperature as possible from the perspective of the heat having an effect on the object to be covered. Consequently, if the film has a heat shrinkage rate of 20% or more and 70% or less under the aforementioned conditions, the film can fully adhere to the object to be covered within the shrinkage processing time, and excellent finish of shrinkage and appearance can be obtained without shrink marks, wrinkles or blisters.

Regarding the second film, in order to adjust the film heat shrinkage rate in the main shrinkage direction into the aforementioned range when immersing in 80° C. water for 10 seconds, it is preferable to adjust the resin composition as described in the present invention, and to adjust the draw temperature to the previously described range. For example, if desiring to further increase the heat shrinkage rate, such techniques may be used as increasing the optical isomer percentage of the polylactic acid resin (A), raising the (meth) acrylic resin (B) content, heightening the draw ratio, and lowering the draw temperature.

Moreover, if the second film is used as a heat-shrinkable label, the heat shrinkage rate orthogonal to the film main shrinkage direction when immersed in 80° C. water for 10 minutes is 10% or less, preferably 5% or less, and more preferably 3% or less. If the heat shrinkage rate orthogonal to the film main shrinkage direction when immersed in 80° C. water for 10 minutes is 10% or less, problems such as shortening of the dimension orthogonal to the film main shrinkage direction after shrinkage, and distortion of the printed design and lettering after shrinkage can be suppressed, and even if square shouldered bottles are used, the occurrence of such problems as longitudinal pulling can be controlled.

(Storage Elastic Modulus)

Regarding the storage elastic modulus (E') of the present invention, it is important that the storage elastic modulus (E') at 70° C. orthogonal to the main shrinkage direction be adjusted to 100 MPa or more and 1.5 GPa or less when measured using a viscoelastic spectrometer under conditions of vibration frequency 10 Hz and distortion 0.1%. If the storage elastic modulus (E') at 70° C. is 100 MPa or more, an excellent finish of shrinkage and a beautiful appearance can be obtained under a broad range of shrinkage conditions because strength can be maintained in the shrinkage temperature region, and this is also preferable from the perspective industrial production. Further, the upper limit value of the aforementioned storage elastic modulus (E') is not particularly stipulated, but 1.5 GPa or less is preferable because there is no loss of low-temperature shrinkage characteristics, 1.2 GPa or less is more preferable, and 1.0 GPa or less is even more preferable.

In order to increase the storage elastic modulus (E') of the second film at 70° C., it is preferable to adjust the resin composition and the manufacturing method as described in the present invention. Concrete adjustment methods include lowering the optical isomer percentage of the polylactic acid resin (A), raising the (meth)acrylic resin (B) content, reducing the amount of plasticizers added, raising the draw temperature, and heightening the heat treatment temperature. Moreover, raising the optical isomer percentage of the polylactic acid resin (A), decreasing the (meth)acrylic resin (B) content, raising the amount of plasticizers added, reducing the draw temperature, and decreasing the heat treatment temperature may be cited as methods to lower the storage elastic modulus (E') at 70° C.

(Elastic Modulus)

The elastic modulus orthogonal to the film main shrinkage direction of the second film bias (rigidity at room temperature) is preferably 1.2 GPa or more, more preferably 1.4 GPa or more, and more preferably 1.6 GPa or more. The upper limit of the elastic modulus of the heat-shrinkable film normally used is about 3.0 GPa, preferably about 2.9 GPa, and more preferably about 2.8 GPa. If the elastic modulus orthogonal to the film main shrinkage direction is 1.2 GPa or more, the bias (rigidity at room temperature) of the Film as a whole can be heightened, and in particular, if the film is thin, when covering a container with a film made into a bag for a container such as a PET bottle, problems that are prone to lower the yield such as covering at a slant and folding along the bias can be controlled. The aforementioned elastic modulus can be measured in conformity to JIS K7127 with the conditions set at 23° C.

In order to adjust the elastic modulus to within the aforementioned range, it is preferable to adjust the resin composition and the manufacturing method as described in the present invention. Raising the (meth)acrylic resin (B) content and lowering the rubber component (C) content may be cited as concrete examples of adjustments to heighten the elastic modulus.

(Transparency)

When measuring a film with, for example, a thickness of 50 μm based on JIS K7105 standards, the transparency of the second film has a film haze value of 10% or less, preferably 7% or less, and more preferably 5% or less. If the haze value is 10% or less, the film is transparent and can manifest a display effect.

In order to adjust the haze value to within the aforementioned range, it is preferable to adjust the resin composition and the manufacturing method as described in the present invention. Lowering the (meth)acrylic resin (B) and rubber component (C) contents in relation to that of the polylactic acid resin (A), bringing the diffraction moduli of the respective raw materials closer together, decreasing the dispersed particle size by heightening the compatibility of the respective raw materials and heightening mixing efficiency, decreasing the draw ratio, and slightly raising the draw temperature may be cited as concrete methods of adjustment.

(Elongation Percentage after Tensile Fracture)

When evaluating the impact resistance of the second film based on the elongation percentage after tensile fracture using tension tests conducted in a 23° C. environment, the elongation percentage in the machine (flow) direction (MD), particularly when used as labels, is 100% or more, preferably 150% or more, and more preferably 200% or more. If the elongation percentage after tensile fracture conducted in a 23° C. environment is 100% or more, the problems of film breakage during such processing steps as printing and making bags are unlikely to occur. Moreover, if the elongation percentage after tensile fracture is 150% or more, breakage will be unlikely even when increasing tensile force on the film in conjunction with speeding up the processes of printing and making bags, which is preferable. The preferable upper limit of elongation percentage after tensile fracture is specifically set, but about 500% is desirable in order to manufacture film at full speed.

In order to adjust the draw rate in the tension tests of the second film in a 23° C. environment to within the aforementioned range, it is preferable to adjust the resin composition and the manufacturing method as described in the present invention. Concrete examples of adjustments include lowering the (meth)acrylic resin (B) content that configures the film, raising the rubber component (C) content, and drawing the film at 1.01 times or more in the pull (flow) direction. The elongation percentage after tensile fracture can be measured at a draw velocity of 200 mm/minute based on JIS K7127.

<Third Heat-Shrinkable Film>

A third heat-shrinkable film of the present invention (called "third film" hereinafter) is a film comprising a mixed resin layer of polylactic acid resin (A) and silicone/acrylic composite rubber (D) as main components.

(Amount of silicone/acrylic composite rubber (D) added)

The silicone/acrylic composite rubber (D) is compounded in the third film at a polylactic acid resin (A) and silicone/acrylic composite rubber (D) mass ratio (polylactic acid resin (A)/silicone/acrylic composite rubber (D)) of 95/5 to 50/50, preferably 90/10 to 60/40, and more preferably 85/15 to 70/30. By compounding the silicone/acrylic composite rubber in this range, the impact resistance can be improved without losing hardly any transparency of the polylactic acid resin.

(Amount of (Meth)Acrylic Resin (B) Added)

Moreover, the aforementioned (meth)acrylic resin (B) may be added to the third film. The (meth)acrylic resin (B) content in relation to the total amount of the mixed resin is 5 mass % or more, preferably 10 mass % or more, and more preferably 15 mass % or more, and is 30 mass % or less, preferably 25 mass % or less, and more preferably 20 mass % or less. If the (meth)acrylic resin (B) content is 5 mass % or more, the glass transition temperature is shifted to the high temperature side, a gentle shrinkage curve is obtained because it is possible to bring the shrinkage start temperature close to the shrinkage temperature region, and as a result, the finish of shrinkage can be improved. Meanwhile, if the aforementioned content is 30 mass % or less, a notable drop in film impact resistance can be suppressed, which is preferable.

(Component (C))

Further, component (C) can be contained in the aforementioned mixed resins of the third film within a range that does not notably impair the effect of the present invention.

(Addition of Flexible Resin)

Further, a flexible resin other than the silicone/acrylic composite rubber may be added to the aforementioned mixed resins of the third film within a range that does not notably impair the effect of the present invention for the purpose of improving impact resistance, transparency, mold processing characteristics, and various other characteristics of the heat-shrinkable film.

Aliphatic polyester resins other than polylactic acid resins, aromatic aliphatic polyester resins, copolymers of diols, carboxylic acid and polylactic acid resins, core-shell structured rubbers, ethylene-vinyl acid copolymer (EVA), ethylene-acrylic acid copolymer (EAA), ethylene-ethyl acrylate copolymer (EEA), ethylene-(meth)acrylic acid copolymer (EMA), and ethylene-methyl (methacrylate) copolymer (EMMA) may be cited as the aforementioned flexible resins.

In particular, aliphatic polyester resins other than polylactic acid resins are preferable in the aforementioned flexible resins. Aliphatic polyester resins other than polylactic acid resins are aliphatic polyesters having aliphatic dicarboxylic acid or derivatives thereof and aliphatic polyhydric alcohols as the main components. Examples of the aliphatic dicarboxylic acid residues used for forming aliphatic polyester resins include succinic acid, adipic acid, suberic acid, sebacic acid and dodecanedioic acid, and the like. Moreover, examples of the aliphatic polyhydric alcohol include aliphatic diols derived from ethylene glycol, 1,4-butanediol, and 1,4-cyclohexanedimethanol, etc.

The aliphatic dicarboxylic acid residues optimally used in the third film are succinic acid residue or adipic acid residue, and the aliphatic polyhydric alcohol is 1,4-butanediol residue.

The melting point of the aliphatic dicarboxylic acid optimally used in the third film is preferably 100° C. or more and 170° C. or less. By adjusting melting point to this range, the crystallinity of this aliphatic polyester can be maintained even in the range of 60° C. to 100° C., at which heat shrinking is normally conducted, and as a result, an excellent finish of shrinkage can be obtained by playing this key role during shrinking.

The content of aliphatic polyester resin other than polylactic acid resin is 5 mass % or more, preferably 10 mass % or more, and more preferably 15 mass % or more, and is 30 mass % or less, preferably 25 mass % or less, and more preferably 20 mass % or less. If the aforementioned content of aliphatic polyester resin other than polylactic acid resin is 5 mass % or more, an effect to suppress shrinkage parallel to the draw direction is manifested, and the finish of shrinkage is improved. Moreover, if 30 mass % or more, a drop in transparency can be suppressed.

(Manufacturing Method)

Well-known methods may be used to manufacture the third film. The shape of the film may be either flat or tubular, but flat is preferable from the perspective of producibility (ability to make a product of several sheets of whole film in the width direction) and the ability to print on the Melting the resins using multiple extruders, co-extruding from a T die, cooling and hardening with a chilled roll, longitudinal roll drawing, annealing, cooling, (corona discharge surface processing, if necessary,) and winding using a winder to obtain a film may, for example, be cited as a method to manufacture the film. Moreover, making a flat shape by cutting a film produced by a tube manufacturing method is also possible.

Melting the resins using multiple extruders, co-extruding from a T die, cooling and hardening with a chilled roll, longitudinal roll drawing, transverse tenter drawing, annealing, cooling, (corona discharge surface processing, if necessary,) and winding using a winder to obtain a film may, for example, be cited as a method to manufacture the film. Moreover, making a flat shape by cutting a film produced by a tube manufacturing method is also possible.

In uses having shrinkage in two directions such as overwrapping, the draw ratio is about 2 times or more and 10 times or less longitudinally and 2 times or more and 10 times or less transversely, and preferably about 3 times or more and 6 times or less longitudinally and 3 times or more and 6 times or less transversely. Meanwhile, in uses having shrinkage mainly in one direction such heat-shrinkable labels, the draw ratio is 2 times or more and 10 times or less in the direction equivalent to the main direction of shrinkage, preferably 3 times or more and 7 times or less, and more preferably 3 times or more and 5 times or less, and orthogonally to that direction, is 1 time or more and 2 times or less (1 time indicates that it is not been drawn), preferably 1.01 times or more and 1.5 times or less, and selection of a draw ratio that is substantially in the category of a uniaxial draw is preferable. A biaxially drawn film that is drawn at a draw ratio within this range does not have too large of a heat shrinkage rate orthogonally to the main shrinkage direction, and for example, if used for heat-shrinkable labels, the film heat shrinks in the height direction of the container when fitted to the container, and the so-called longitudinal pull phenomenon may be suppressed, which is preferable.

It is necessary to vary the draw temperature depending on the glass transition temperature of the resin used and the characteristics required for the heat-shrinkable film, but the temperature is roughly controlled in the range of a lower limit of 60° C. or more, preferably 70° C. or more, and an upper limit of 100° C. or less, preferably 90° C. or less.

Next, after the drawn film has undergone heat treatment at a temperature of about 50° C. or more and 100° C. or less and then relaxation treatment as necessary in order to decrease the natural shrinkage rate and to improve the heat shrinkage characteristics and the like, rapidly cooling is conducted within a time that does not relax the molecular orientation, and a heat-shrinkable film is obtained.

Moreover, the third film may be further subjected to surface treatment and surface processing such as corona processing, printing, coating, and vapor deposition, as well as to bag production by using various solvents or heat sealing, and to perforation processing and the like.

(Layer Configuration)

The configuration of the third film may be a single layer, or the configuration may be a laminate for the purpose of adding surface function characteristics to the film such as sliding characteristics, flame resistance, solvent resistance, and ease of bonding. Specifically, the mixed resin layer may be a laminate with at least 1 layer. For example, if layers (II) and (III) are laminated on layer (I) comprising the mixed resin of the present invention, the lamination configuration may include (I)/(II), (II)/(I)/(II), (II)/(I)/(III), (II)/(I)/(III)/(II), and the like. Moreover, the lamination ratio of the various layers may be arranged at the applicable time corresponding to the use and purpose.

An optimal configuration of the third film is when layer (II) is the layer having the main component of polylactic acid resin. Specifically, the D/L ratio of the polylactic acid resins comprising layer (II) preferably differs from the D/L ratio comprising the layer (I). Even better finish of shrinkage can be realized by varying the D/L ratios and arranging layers (I) and (II) to have differing crystallinity.

Co-extrusion, laminating and heat sealing after molding the films of the various layers, and bonding with adhesives may be cited as methods to mold the aforementioned laminates.

There are no particular limits to the overall thickness of the third film whether a single layer or a laminate, but thinner is preferable from the perspective of transparency, shrink processing characteristics, source material costs, and the like. Concretely, the overall thickness of the film after drawing is 80 µm or less, preferably 70 µm or less, and more preferably 50 µm or less. Moreover, there are no particular limits to the lower limit of the film, but 20 µm or more is preferable considering the handling characteristics of the film.

(Shrinkage Rate)

As described above, it is important that the heat shrinkage rate of the third film in the film main shrinkage direction be 20% or more when immersing in 80° C. water for 10 seconds. A more preferable shrinkage rate is 30% or more.

This is an index to judge the applicability to a shrinkage processing step of a comparatively short time (several seconds to about 10 seconds) in such uses as PET bottle shrinkable labels. Currently, the shrinkage processing equipment most often used industrially for fitting PET bottle with labels is generally called a steam shrinker, and uses steam as the thermal medium to conduct the shrinkage process. Further, it is necessary for the heat-shrinkable film to undergo sufficient heat shrinkage at as low a temperature as possible in terms of the affect of the heat on the covered object. Nonetheless, if the layers have extremely different heat shrinkage rates based on temperature, the higher the temperature dependence, the more prone the film is to shrinkage shrink marks, wrinkles and blisters, and to a poorer finish of shrinkage and appearance. From the perspective of industrial producibility, if the heat shrinkage rate in the film main shrinkage direction is 20% or more when immersing in 80° C. water for 10 seconds, the film can fully adhere to the object to be covered within the shrinkage processing time, and excellent finish of shrinkage and appearance can be obtained without shrink marks, wrinkles or blisters. Therefore, the heat shrinkage rate of the third film at 80° C. is more preferably 20% or more and 70% or less.

Moreover, if the third film is used as a heat-shrinkable label, the heat shrinkage rate orthogonal to the film main shrinkage direction when immersed in 80° C. water for 10 minutes is 10% or less, preferably 5% or less, and more preferably 3% or less. If the heat shrinkage rate orthogonal to the film main shrinkage direction when immersed in 80° C. water for 10 minutes is 10% or less, problems such as shortening of the dimension orthogonal to the film main shrinkage direction after shrinkage, and distortion of the printed design and lettering after shrinkage can be suppressed, and even if square shouldered bottles are used, the occurrence of such problems as longitudinal pulling can be controlled, which is preferable.

Further, the upper limit of the aforementioned heat shrinkage is not described, but because heat shrinking cannot make a length shorter than that prior to drawing the film, the upper limit of heat shrinkage is the shrinkage rate to make the film the length prior to drawing.

(Transparency)

When measuring a film with, for example, a thickness of 50 μm based on JIS K7105 standards, the transparency of the third film has a film haze value of 10% or less, preferably 7% or less, and more preferably 5% or less. If the haze value is 10% or less, the film is transparent and can manifest a display effect.

(Elongation Percentage after Tensile Fracture)

When evaluating the impact resistance of the third film based on the elongation percentage after tensile fracture using tension tests conducted in a 0° C. environment and a tension velocity of 100 mm/minute, the elongation percentage in the machine (flow) direction (MD), particularly when used as labels, is 100% or more, preferably 150% or more, and more preferably 200% or more. If the elongation percentage after tensile fracture conducted in a 0° C. environment a tension velocity of 100 mm/minute is 100% or more, the problems of film breakage during such processing steps as printing and making bags are unlikely to occur, and is preferable. Moreover, if the elongation percentage after tensile fracture is 150% or more, breakage will be unlikely even when increasing tensile force on the film in conjunction with speeding up the processes of printing and making bags, which is preferable. The preferable upper limit of elongation percentage after tensile fracture is not particularly limited, but considering current processing speeds about 500% appears to be sufficient, and if elongation exceeds this, film rigidity is prone to decrease.

<Fourth Heat-Shrinkable Film>

A fourth heat-shrinkable film of the present invention (called "fourth film" hereinafter) is a film that has at least 2 layers with a layer (I) comprising mixed resin layer of polylactic acid resin (A), (meth)acrylic resin (B), and rubber component (C) and a layer (II) having a main component of polylactic acid resin (A), that is drawn at least in 1 direction, and that has a specified shrinkage rate.

(Amount of (meth)acrylic Resin (B) Added)

Moreover, the amount of (meth)acrylic resin (B) added to the fourth film in relation to the total amount of the mixed resin comprising layer (I) is 5 mass % or more, preferably 10 mass % or more, and more preferably 15 mass % or more, and is 30 mass % or less, preferably 25 mass % or less, and more preferably 20 mass % or less. If the (meth)acrylic resin (B) content is 5 mass % or more, the effects of improving the shrinkage characteristics, finish of shrinkage, and transparency of the film can be fully obtained. Meanwhile, a (meth) acrylic resin (B) content percentage of 30 mass % or less is preferable because the draw characteristics can be maintained at low temperature without a notable drop in the impact resistance of the film, and a sufficient heat shrinkage rate can be fully obtained in a practical temperature range (about 70° C. to 90° C.).

(Amount of Rubber Component (C) Added)

Moreover, the amount of rubber component (C) added to the fourth film in relation to the total amount of the mixed resin comprising layer (I) is 5 mass % or more, preferably 10 mass % or more, more preferably 15 mass % or more, and is 50 mass % or less, preferably 40 mass % or less, and more preferably 30 mass % or less. If the amount of rubber component (C) added is 5 mass % or more and 50 mass % or less, the film may be suitably used for heat-shrinkable labels without losing film rigidity and transparency.

(Other Added Components)

Further, the aforementioned other added components may be added as necessary. Concretely, it is possible to mix the aforementioned other thermoplastic resin in the mixed resin comprising the aforementioned layer (I). Moreover, other resins such as the aforementioned other thermoplastic resins may be mixed in the resins comprising the aforementioned layer (II) within a range that does not lose the effects of the invention.

Further, the aforementioned types of plasticizers may be added to the aforementioned layer (I) and layer (II) within a range that does not notably impair the effects of the fourth film in order to improve the impact resistance, transparency, molding process characteristics, and overall characteristics of the heat-shrinkable film.

Specifically, if adding the aforementioned plasticizer, adding only to the layer (I) is preferable. The plasticizer may be added to the layer (II), but it becomes difficult to add a sufficient amount to manifest an effect because elution of the plasticizer over time is a concern. Concretely, the characteristics affected by elution of the plasticizer over time include film blocking, changes in slide characteristics, and unsatisfactory appearance.

In addition to the components described above, the aforementioned other types of additives may be suitably added to the fourth film within a range that does not notably impair the effects of the fourth film.

(Lamination Structure)

If the fourth film is configured by at least 2 layers with a layer (I) comprising mixed resin layer of polylactic acid resin (A), (meth)acrylic resin (B), and rubber component (C) and a layer (II) having a main component of polylactic acid resin (A), the configuration of the layers is not particularly limited. In addition to the layer (I), the characteristics of the heat-shrinkable film, specifically the heat shrinkage characteristics, can be easily adjusted by laminating with the layer (II) having a main component of polylactic acid resin.

In order to improve the heat shrinkage characteristics of the fourth film, the heat shrinkage characteristics and fracture resistance can be further improve by laminating layer (I) and layer (II), which have differing D unit content ratios.

Concretely, in the aforementioned relationship, the D/L ratio of the lactic acid resin comprising the layer (I) is preferably 5/95 to 15/85 or 85/15 to 95/5, and more preferably 7/93 to 13/87 or 87/13 to 93/7. Moreover, the D/L ratio of the lactic acid resin comprising the layer (II) is preferably 5/95 to 10/90 or 10/90 to 95/5, and more preferably 6/94 to 9/91 or 91/9 to 94/6. As previously described, by adjusting the D/L ratios of layer (I) and layer (II), the degree of crystallization is kept to the optimum range, generation of such problems as shrinkage shrink marks in conjunction with crystallization can be controlled, and at the same time even better finish of shrinkage can be realized.

Further, "having at least 2 layers with a layer (I) and a layer (II)" means not only that the layer (II) is laminated adjacent to the layer (I) on one or both sides, but a third layer may be comprised for the purpose of improving the adhesion characteristics between layer (I) and layer (II), and for contributing barrier characteristics, concealment characteristics, and thermal insulation characteristics. Preferable layer configurations include a 2 type 3 layer configuration with layer (I) as the middle layer and layer (II) as the surface layers (layer (II)/layer (I)/layer (II)), or a 3 type 5 layer configuration with adhesive layers between the middle and surface layers (layer (II)/adhesive layer/layer (I)/adhesive layer/layer (II).

The optimum lamination configuration of the fourth film is a 2 type 3 layer configuration "layer (II)/layer (I)/layer (II)". This is because the surface adjustment is easier by having layer (II), which has a main component of the polylactic acid resin (A), as the surface layers.

(Thickness)

There are no particular limits to the overall thickness of the fourth film, but percentage of layer (I) to the overall thickness is preferably 50% or more and 95% or less, and more preferably 60% or more and 90% or less. If layer (I) is within the aforementioned range, the fracture resistance and finish of shrinkage will be excellent.

There are no particular limits to the overall thickness of the fourth film, but thinner is preferable from the perspective of transparency, shrink processing characteristics, source material costs, and the like. Concretely, the overall thickness of the film after drawing is 80 μm or less, preferably 70 μm or less, and more preferably 50 μm or less. Moreover, there are no particular limits to the lower limit of the film, but 20 μm or more is preferable considering the handling characteristics of the film.

(Manufacturing Method)

Well-known methods may be used to manufacture the fourth film. The shape of the film may be either flat or tubular, but flat is preferable from the perspective of producibility (ability to make a product of several sheets of whole film in the width direction) and the ability to print on the Melting the resins using multiple extruders, co-extruding from a T die, cooling and hardening with a chilled roll, longitudinal roll drawing, annealing, cooling, (corona discharge surface processing, if necessary,) and winding using a winder to obtain a film may, for example, be cited as a method to manufacture the film. Moreover, making a flat shape by cutting a film produced by a tube manufacturing method is also possible.

In uses having shrinkage in two directions such as overwrapping, the draw ratio is about 2 times or more and 10 times or less longitudinally and 2 times or more and 10 times or less transversely, and preferably about 3 times or more and 6 times or less longitudinally and 3 times or more and 6 times or less transversely. Meanwhile, in uses having shrinkage mainly in one direction such heat-shrinkable labels, the draw ratio is 2 times or more and 10 times or less in the direction equivalent to the main direction of shrinkage, and preferably 4 times or more and 8 times or less, and orthogonally to that direction, is 1 time or more and 2 times or less, preferably 1.01 times or more and 1.5 times or less, and selection of a draw ratio that is substantially in the category of a uniaxial draw is preferable. One time indicates that it is not been drawn.

A biaxially drawn film that is drawn at a draw ratio within the aforementioned range does not have too large of a heat shrinkage rate orthogonally to the main shrinkage direction, and for example, if used for heat-shrinkable labels, the film heat shrinks in the height direction of the container when fitted to the container, and the so-called longitudinal pull phenomenon may be suppressed, which is preferable.

It is necessary to vary the draw temperature depending on the glass transition temperature of the resin used and the characteristics required for the heat-shrinkable film, but the temperature is roughly controlled in the range of a lower limit of 60° C. or more, preferably 70° C. or more, and an upper limit of 100° C. or less, preferably 90° C. or less. Moreover, the draw ratio corresponds to the characteristics of the resin used, the draw means, draw temperature, shape of the target product, and the like, and is suitably determined in a uniaxial or biaxial direction in the range of 1.5 times or more and 10 times or less in the main shrinkage direction, preferably 3 times or more and 7 times or less, and more preferably 3 times or more and 5 times or less. In addition, even when a uniaxial transverse draw is used, it is effective to also have a slight draw of about 1.05 times or more and 1.8 times or less longitudinally for the purpose of improving the mechanical properties of the film. Next, after the drawn film has undergone heat treatment at a temperature of about 50° C. or more and 100° C. or less and then relaxation treatment as necessary in order to decrease the natural shrinkage rate and to improve the heat shrinkage characteristics and the like, rapidly cooling is conducted within a time that does not relax the molecular orientation, and a heat-shrinkable film is obtained.

(Processing)

Moreover, the fourth film may be further subjected to surface treatment and surface processing such as corona processing, printing, coating, and vapor deposition, as well as to bag production by using various solvents or heat sealing, and to perforation processing and the like.

The fourth film is processed into shapes from flat to cylindrical depending on the object to be packaged, and is then provided for packaging. If printing is required for a cylindrical container such as a PET bottle, first the required image may be printed on one surface of a wide flat film that is wrapped around a roller, and then the necessary width is cut and the film is made into a cylindrical shape by folding back with the printed surface to the inside and sealing the center. In this case, the shape of the sealed part is called an envelope seal.

The aforementioned center may be sealed by bonding using an organic solvent, heat sealing, use of an adhesive, or impulse sealing. Of these, bonding using an organic solvent is preferable from the perspective of producibility and appearance.

(Heat Shrinkage Rate)

As described above, the heat shrinkage rate of the fourth film in the film main shrinkage direction when immersing in 80° C. water for 10 seconds is 20% or more. More preferably, it is 30% or more. This is an index to judge the applicability to a shrinkage processing step of a comparatively short time (several seconds to about 10 seconds) in such uses as PET bottle shrinkable labels.

Currently, the shrinkage processing equipment most often used industrially for fitting PET bottle with labels is generally called a steam shrinker, and uses steam as the thermal medium to conduct the shrinkage process. Further, it is necessary for the heat-shrinkable film to undergo sufficient heat shrinkage at as low a temperature as possible in terms of the affect of the heat on the covered object. Nonetheless, if the layers have extremely different heat shrinkage rates based on temperature, the higher the temperature dependence, the more prone the film is to shrinkage shrink marks, wrinkles and blisters, and to a poorer finish of shrinkage and appearance. From the perspective of industrial producibility, if the heat shrinkage rate in the film main shrinkage direction is 20% or more when immersing in 80° C. water for 10 seconds, the film can fully adhere to the object to be covered within the shrinkage processing time, and excellent finish of shrinkage and appearance can be obtained without shrink marks, wrinkles or blisters. Therefore, the heat shrinkage rate of the fourth film at 80° C. is more preferably 20% or more and 70% or less.

Further, the upper limit of the aforementioned heat shrinkage is not described, but because heat shrinking cannot make a length shorter than that prior to drawing the film, the upper limit of heat shrinkage is the shrinkage rate to make the film the length prior to drawing.

Meanwhile, it possible to obtain an even superior finish of shrinkage by keeping a low shrinkage rate perpendicular to the film main shrinkage direction. Moreover, if the fourth film is used as a heat-shrinkable label, the heat shrinkage rate perpendicular to the film main shrinkage direction when immersed in 80° C. water for 10 minutes is 5% or less, preferably 4% or less, and more preferably 3% or less. If the heat shrinkage rate orthogonal to the film main shrinkage direction when immersed in 80° C. water for 10 minutes is 5% or less, problems such as shortening of the dimension orthogonal to the film main shrinkage direction after shrinkage, and distortion of the printed design and lettering after shrinkage can be suppressed, and even if square shouldered bottles are used, the occurrence of such problems as longitudinal pulling can be controlled. The lower limit of the heat shrinkage rate in this case is 0%.

(Transparency)

When measuring a film with, for example, a thickness of 50 μm based on JIS K7105 standards, the transparency of the fourth film has a film haze value of 10% or less, preferably 7% or less, and more preferably 5% or less. If the haze value is 10% or less, the film is transparent and can manifest a display effect.

(Elongation Percentage after Tensile Fracture)

When evaluating the impact resistance of the fourth film based on the elongation percentage after tensile fracture using tension tests conducted in a 0° C. environment and a tension velocity of 100 mm/minute, the elongation percentage in the machine (flow) direction (MD), particularly when used as labels, is 100% or more, preferably 150% or more, and more preferably 200% or more. If the elongation percentage after tensile fracture conducted in a 0° C. environment a tension velocity of 100 mm/minute is 100% or more, the problems of film breakage during such processing steps as printing and making bags are unlikely to occur, and is preferable. Moreover, if the elongation percentage after tensile fracture is 150% or more, breakage will be unlikely even when increasing tensile force on the film in conjunction with speeding up the processes of printing and making bags, which is preferable.

The preferable upper limit of elongation percentage after tensile fracture is not particularly limited, but considering current processing speeds, about 500% appears to be sufficient, and if elongation exceeds this, film rigidity is prone to decrease.

[Use]

Depending on the object to be packaged, the aforementioned first to fourth heat-shrinkable films can be processed from a flat to a cylindrical shape, and then presented for packaging. If the object is a cylindrical container such as a PET bottle requiring printing, the necessary images are first printed on one surface of a broad flat film taken up on a roll, and then this may be cut to the necessary width and made into a cylindrical shape by folding the printed surface to the inside, and then center sealing (the shape of the sealed part is the so-called envelope seal).

Center sealing methods include affixing using an organic solvent, heat sealing, using adhesives, and impulse sealing. among these, affixing using an organic solvent is most suitable in terms of producibility and appearance.

Because of superior film heat shrinking characteristics, finish of shrinkage and transparency, the uses of the first to fourth heat-shrinkable films are not particularly limited, and by laminating with printed layers, vapor deposition layers and other functional layers as necessary, the films can be used as a variety of molded products such as bottles (blown bottles), trays, lunch boxes, fruit and vegetable containers, and milk product containers. Specifically, if the aforementioned first to fourth heat-shrinkable films are used as heat-shrinkable labels for food containers (for example, PET bottles and glass jars, preferably PET bottles, for cold beverages and water and for food), a close fit is possible even with complicated shapes (for example, cylinders with a recessed center, square columns with edges, pentagonal cylinders, and octagonal cylinders and the like), and a container with a beautiful label free of wrinkles or blisters can be obtained. These molded products or containers fitted with labels can be produced using ordinary molding methods. Moreover, the aforementioned molded product can be used as containers by configuring with molded products comprising other materials.

Because of superior low temperature shrinking characteristics and finish of shrinkage, the aforementioned first to fourth heat-shrinkable films may be suitably utilized not only as heat-shrinkable label material for plastic molded products, which under deformation when heated to a high temperature, but also as a heat-shrinkable label material for packaging (containers) using materials that have extremely different thermal expansion ratios and water absorption characteristics than those of the first to fourth heat-shrinkable films, for example, at least 1 kind selected from metal, porcelain, glass, paper, polyethylene, polypropylene, polyolefin resins such as polybutene, polymethacrylic acid ester resins, polycarbonate resins, polyethylene terephthalate, polyester resins such as polybutylene terephthalate, and polyamide resins.

In addition to the aforementioned resins, examples of materials that comprise plastic packaging with which the aforementioned first to fourth heat-shrinkable films may be utilized include polystyrene, rubber modified high impact polystyrene (HIPS), styrene-butylacrylate copolymer, styrene-acrylonitrile copolymer, styrene-anhydrous maleic acid copolymer, acrylonitrile-butadiene-styrene copolymer (ABS), (meth)acrylic acid-butadiene-styrene copolymer (MBR), polyvinyl chloride resins, phenol resin, urea resin, melamine resin, epoxy resin, silicone resin, and the like. Mixtures or laminates of 2 or more of these plastic packaging materials may also be used.

EXAMPLES

Examples of the present invention will be explained below.

Further, the measurements and evaluations indicated in the examples were conducted as follows. In the examples, the direction of take up (flow) of the laminated film is called the "longitudinal" direction (or MD), and the direction orthogonal to that is called the "transverse" direction (or TD).

[Evaluation]

(1) Heat Shrinkage Rate

The film was cut to the size of 100 mm longitudinally and 100 mm transversely and immersed in a 60° C. or 80° hot water bath for 10 seconds, and the amount of shrinkage was measured. The heat shrinkage rate expresses the percentage (%) of the amount of shrinkage in relation to the original dimensions prior to shrinking for the longitudinal direction or transverse direction, whichever is greater.

(2) ΔHm−ΔHc

Using a differential scanning calorimeter DSC-7 manufactured by Perkin Elmer, 10 mg of test material was heated from −40° C. to 250° C. at a heating velocity of 10° C./minute in conformity to JIS K7127. The ΔHm, which is the amount of heat necessary to melt all the crystals contained in the film, and the ΔHc, which is the amount of heat produced by crystallization during heat measurement, are calculated from the thermograph.

(⊚): ΔHm−ΔHc is 15 J/g or less
O: ΔHm−ΔHc is greater than 15 J/g and 25 J/g or less
X: ΔHm−ΔHc is greater than 25 J/g (3) Dynamic Viscoelasticity Measurement The film to be measured was cut the size of longitudinal 60 mm and transverse 4 mm, and was measured in the longitudinal direction using a viscoelastic spectrometer (manufactured by IT Instruments (Co., Ltd.), VDA-200) at vibration frequency 10 Hz, distortion 0.1%, heating velocity 1° C./minute, chuck interval 2.5 cm, and in the measurement temperature range from 0 to 150° C.; and the storage elastic modulus was measured at 70° C.

(4) Haze Value

The haze value of the film with a film thickness of 50 μm was measured in conformity to JIS K7105.

(5) Elongation Percentage after Tensile Fracture

The direction (longitudinal direction) orthogonal to the film main shrinkage direction was measured under the conditions of temperature 23° C. at the following test velocities in conformity to JIS K7127.

First film, third film, fourth film: test velocity 100 mm/minute
Second film: test velocity 200 mm/minute Further, for the third and fourth films, the film obtained was cut to a size of 110 mm in the direction (longitudinal direction) orthogonal to the film main shrinkage direction and to 15 mm in the main shrinkage direction; the measurements were taken at an atmospheric temperature of 0° C.; and then the mean value of 10 measurements was calculated.

(6) Elastic Modulus

The direction (longitudinal direction) orthogonal to the film main shrinkage direction was measured under the conditions of temperature 23° C. in conformity to JIS K7127.

(7) Finish of Shrinkage

<< In Relation to the First Film>>

Film printed with gridlines at 10 mm intervals was cut to the size of longitudinal 100 mm and transverse 298 mm, and a cylindrical film was produced by overlapping both transverse ends 10 mm and affixing with tetrahydrofuran (THF) solvent. This cylindrical film was fitted to a cylindrical PET bottle with a 1.5 L volume, and was passed through a steam heating type shrinking tunnel with a length of 3.2 m (3 zones) for approximately 4 seconds without rotation. The atmospheric temperature in all zones of the tunnel was kept in the range of 70 to 85° C. by using steam valves to adjust the amount of steam. After covering, the films were evaluated by the following standards.

(⊚): Full shrinkage with no wrinkles, blisters or distortion of the gridlines at all.
O: Full shrinkage with very slight wrinkles, blisters or distortion of the gridlines.
X: Shrinkage insufficient, or notable wrinkles, blisters or distortion of the gridlines <<In Relation to the Second Film>>

Film printed with gridlines at 10 mm intervals was cut to the size of longitudinal (MD) 170 mm×transverse (TD) 114 mm, and a cylindrical film was produced by overlapping both transverse (TD) ends 10 mm and affixing with tetrahydrofuran (THF) solvent. A container was covered by fitting this cylindrical film to a cylindrical PET bottle with a 500-ml volume, and passing this through a steam heating type shrinking tunnel with a length of 3.2 m (3 zones) for approximately 4 seconds without rotation. The atmospheric temperature in all zones of the tunnel was kept in the range of 60 to 90° C. by using steam valves to adjust the amount of steam. The atmospheric temperatures at this time are indicated below.

Covering condition 1: 65° C./80° C./80° C.
Covering condition 2: 90° C./90° C./60° C.
Covering condition 3: 75° C./85° C./85° C.

After covering, the films were evaluated by the following standards.

(⊚): Full shrinkage with no wrinkles, blisters or distortion of the gridlines at all.
O: Full shrinkage with very slight wrinkles, blisters or distortion of the gridlines, but no practical problems.
Δ: Full shrinkage with very slight wrinkles, blisters or distortion of the gridlines leading to practical problems.
X: Shrinkage insufficient, or notable wrinkles, blisters or distortion of the gridlines <<In Relation to the Third Film>>

Film printed with gridlines at 10 mm intervals was cut to the size of longitudinal (MD) 170 mm×transverse (TD) 114 mm, and a cylindrical film was produced by overlapping both transverse (TD) ends 10 mm and affixing with tetrahydrofuran (THF) solvent. A container was covered by fitting this cylindrical film to a cylindrical PET bottle with a 500-ml volume, and passing this through a steam heating type shrinking tunnel with a length of 3.2 m (3 zones) for approximately 4 seconds without rotation. The atmospheric temperature in all zones of the tunnel was kept in the range of 70 to 90° C. by using steam valves to adjust the amount of steam.

After covering, the films were evaluated by the following standards.

(⊚): Full shrinkage with no wrinkles, blisters or distortion of the gridlines at all.
O: Full shrinkage with very slight wrinkles, blisters or distortion of the gridlines, but no practical problems.
Δ: Full shrinkage with very slight wrinkles, blisters or distortion of the gridlines leading to practical problems.
X: Shrinkage insufficient, or notable wrinkles, blisters or distortion of the gridlines <<In Relation to the Fourth Film>>

Film printed with gridlines at 10 mm intervals was cut to the size of longitudinal (MD) 170 mm×transverse (TD) 114 mm, and a cylindrical film was produced by overlapping both transverse (TD) ends 10 mm and affixing with tetrahydrofuran (THF) solvent. A container was covered by fitting this cylindrical film to a cylindrical PET bottle with a 500-ml volume, and passing this through a steam heating type shrinking tunnel with a length of 3.2 m (3 zones) for approximately 4 seconds without rotation. The atmospheric temperature in all zones of the tunnel was kept in the range of 70 to 85° C. by using steam valves to adjust the amount of steam.

After covering, the films were evaluated by the following standards.

(⊚): Full shrinkage with no wrinkles, blisters or distortion of the gridlines at all.
O: Full shrinkage with very slight wrinkles, blisters or distortion of the gridlines, but no practical problems.
Δ: Full shrinkage with very slight wrinkles, blisters or distortion of the gridlines leading to practical problems.
X: Shrinkage insufficient, or notable wrinkles, blisters or distortion of the gridlines

[Raw Materials]

The raw materials used the various examples and comparative examples were as follows.

(Polylactic Acid Resin (A))

Polylactic acid resin: Manufactured by Nature Works LLC, commercial name "NatureWork NW4050", L/D mass=95/5, abbreviated "PLAL" hereinafter.
Polylactic acid resin: Manufactured by Nature Works LLC, commercial name "NatureWork NW4032", L/D mass=99.5/0.5, abbreviated "PLA2" hereinafter.

Polylactic acid resin: Manufactured by Nature Works LLC, commercial name "NatureWork NW4060", L/D mass=88/12, abbreviated "PLA3" hereinafter.

((Meth)acrylic resin (B))

Polymethyl methacrylate resin: Manufactured by Sumitomo Chemicals (Co., Ltd.), commercial name "Sumipex LG21", abbreviated "PMMA1" hereinafter.

Polymethyl methacrylate resin: Manufactured by Mitsubishi Rayon (Co., Ltd.), commercial name "Acrylpet VH01", abbreviated "PMMA2" hereinafter.

Acrylic resin: Manufactured by Mitsubishi Rayon (Co., Ltd.), commercial name "Acrylpet VH01, Methyl Methacrylic Acid Resin", abbreviated "VH01" hereinafter.

(Rubber Component (C))

Core-shell structured acryl-silicone copolymer: manufactured by Mitsubishi Rayon (Co., Ltd.), commercial name "Metabrene S2001", abbreviated "rubber 1" hereinafter.

Polylactic acid resin-aliphatic polyester resin: manufactured by Dainippon Ink Chemical Industries (Co., Ltd.), commercial name "Plamete PD150", abbreviated "rubber 2" hereinafter.

Eth6ylene-polyvinyl shell-core resin: manufactured by Mitsui DuPont Chemical (Co., Ltd.), commercial name "Evaflex EV45LX", abbreviated "rubber 3" hereinafter.

Aliphatic polyester resin: manufactured by Daicel Chemical Industries (Co., Ltd.), commercial name "Celgreen PH7", abbreviated "rubber 4" hereinafter.

Aliphatic polyester resin: manufactured by Showa Macromolecule (Co., Ltd.), commercial name "Bionolle 1010", abbreviated "rubber 5" hereinafter.

Aliphatic polyester resin: manufactured by Showa Highpolymer (Co., Ltd.), commercial name "Bionol 3003", abbreviated "rubber 6" hereinafter.

Aliphatic polyester resin: manufactured by Mitsubishi Chemical (Co., Ltd.), commercial name "GS-Pla AZ91T", abbreviated "rubber 7" hereinafter.

(Silicone/Acrylic Composite Rubber (D))

Silicone/acrylic composite rubber: manufactured by Mitsubishi Rayon (Co., Ltd.), commercial name Metabrene S2001, core-shell structured acryl-silicone copolymer, abbreviated "S2001" hereinafter.

(Additives)

Polyester plasticizer: manufactured by Dainippon Ink & Chemicals Inc.), commercial name "DOZ", abbreviated "plasticizer" hereinafter.

Hydrophobic silica particles: manufactured by Fuji Silycia Chemical (Co., Ltd.), commercial name "Sylophobic", abbreviated "silica particles" hereinafter.

Examples in Relation to the First Film

Example 1

As indicated in Table I, a mixed resin of PLA1: 50 mass %, PMMA2: 25 mass %, and rubber 1: 25 mass % was fed into a biaxial extruder (manufactured by Mitsubishi Heavy Industries (Co., Ltd.)), was fused and mixed at the set temperature of 200° C., and after extruding from a T die fitting, was taken up on by a cast roll at 50° C., and was allowed to cool and solidify, yielding a 250µ thick undrawn sheet with a width of 300 mm. Next, this was transversely drawn uniaxially 5.0 times at a pre-heating temperature of 90° C. and a drawing temperature of 85° C. using a film tenter (manufactured by Mitsubishi Heavy Industries (Co., Ltd.)), yielding a heat-shrinkable film with a width of 50µ. Film that was (O) on all evaluation items was given an overall evaluation of "(O)"; film that included a O was evaluated "O", and film that had even 1× was evaluated "X". The evaluation results are indicated in Table 1.

Example 2

As indicated in Table 1, other than changing rubber 1 in Example 1 to rubber 2, and changing the composition ratio PLA1:60 mass %, PMMA1:15 mass %, and rubber 2:25 mass %, a heat-shrinkable film the same as Example 1 was obtained. The evaluation results are indicated in Table 1.

Example 3

As indicated in Table 1, other than excluding rubber 1 from Example 1, and changing the composition ratio PLA1:60 mass %, PMMA1:40 mass %, a heat-shrinkable film the same as Example 2 was obtained. The evaluation results are indicated in Table 1.

Example 4

As indicated in Table 1, other than including PLA2 in Example 1, and changing the composition ratio PLA1:30 mass %, PLA2:20 mass %, PMMA1:25 mass %, and rubber 1:25 mass %, a heat-shrinkable film the same as Example 1 was obtained. The evaluation results are indicated in Table 1.

Example 5

As indicated in Table 1, other than using a 2 type 3 layer feed block to co-extrude a mixed resin layer (indicated by "other layer" in Table 1), having 0.3 mass parts added in relation to the 100 mass parts of the mixed resin of PLA1: 90 mass % and PMMA1: 10 mass %, onto both surfaces of a mixed resin layer of the same composition ratio (indicated by "middle layer" in Table 1) in Example 4, and adjusting the thickness ratio to outer layer:middle layer:outer layer=30 µm:190 µm:30 µm, a heat-shrinkable film the same as Example 3 was obtained. The evaluation results are indicated in Table 1.

Example 6

As indicated in Table 1, other than changing rubber 1 in Example 1 to rubber 3, and changing the composition ratio PLA1:45 mass %, PMMA1:25 mass %, and rubber 3:30 mass %, a heat-shrinkable film the same as Example 1 was obtained. The evaluation results are indicated in Table 1.

Comparative Example 1

As indicated in Table 1, other than changing the composition ratio in Example 1 to PLA1:75 mass %, rubber 1:25 mass %, and excluding PMMA1, a heat-shrinkable film the same as Example 1 was obtained. The evaluation results are indicated in Table 1.

Comparative Example 2

As indicated in Table 1, other than changing the composition ratio in Example 4 to PLA1:55 mass %, PLA2:20 mass %, rubber 1:25 mass %, and excluding PMMA1, a heat-shrinkable film the same as Example 4 was obtained. The evaluation results are indicated in Table 1.

Comparative Example 3

As indicated in Table 1, other than changing the composition ratio in Example 1 to PLA1:35 mass %, PMMA1:40 mass %, rubber 1:25 mass %, an attempt was made to obtain a heat-shrinkable film the same as Example 1 but the sheet broke midway during drawing.

Comparative Example 4

As indicated in Table 1, other than changing the composition ratio in Example 1 to PLA1:73 mass %, PMMA1:2 mass %, rubber 1:25 mass %, a heat-shrinkable film the same as Example 1 was obtained. The evaluation results are indicated in Table 1.

applicable for uses such as shrink packaging, shrink wrap packaging, and heat-shrinkable labels.

Examples in Relation to the Second Film

Examples 7 to 10, Comparative Examples 5 to 7

For the resins of layer (I) indicated in Table 2, a mixed resin of component (A), component (B), and component (C) was fed into a biaxial extruder (manufactured by Mitsubishi Heavy Industries (Co., Ltd.)), was fused and mixed at the set

TABLE 1

| | | | | Example | | | | | | Comparative Example | | | |
|---|---|---|---|---|---|---|---|---|---|---|---|---|---|
| | | | | 1 | 2 | 3 | 4 | 5 | 6 | 1 | 2 | 3 | 4 |
| Raw material | Middle layer | Component (A) | PLA1 (mass parts) | 50 | 60 | 60 | 30 | 30 | 45 | 75 | 55 | 35 | 73 |
| | | | PLA2 (mass parts) | | | | 20 | 20 | | | 20 | | |
| | | Component (B) | PMMA1 (mass parts) | 25 | 15 | 490 | 25 | 25 | 25 | | | 40 | |
| | | | Rubber 1 (mass parts) | 25 | | | 25 | 25 | | 25 | 25 | 25 | 25 |
| | | Component (C) | Rubber 2 (mass parts) | | 25 | | | | | | | | |
| | | | Rubber 3 (mass parts) | | | | | | 30 | | | | |
| | Outer layer | Component (A) | PLA1 (mass parts) | | | | | | 90 | | | | |
| | | Component (B) | PMMA1 (mass parts) | | | | | | 10 | | | | |
| | | Silica particles | (mass parts) | | | | | | 0.3 | | | | |
| | Heat shrinkage rate | 60° C. (%) | | 7 | 1 | 8 | 1 | 0 | 6 | 3 | 4 | Cannot draw because of fracture | 2 |
| | | 80° C. (%) | | 68 | 50 | 78 | 63 | 68 | 65 | 16 | 17 | | 21 |
| Evaluation of physical properties | ΔHm − ΔHc (J/g) | | | 5 | 11 | 6 | 12 | 13 | 6 | 29 | 34 | | 26 |
| | Finish of shrinkage | | | (◯) | (◯) | (◯) | (◯) | (◯) | (◯) | X | X | | X |
| | Low temperature elongation percentage after tensile fracture (%) | | | 188 | 202 | 4 | 222 | 145 | 223 | 432 | 343 | | 386 |
| | Total evaluation | | | (◯) | (◯) | ◯ | ◯ | (◯) | (◯) | X | X | | X |

Results

The films of Examples 1 through 6 having a mass ratio of polylactic acid resin (A) and (meth)acrylic resin (B) stipulated for the first film in Table 1 had superior finish of shrinkage compared to that of the comparative examples. In contrast, it was demonstrated that when (meth)acrylic resin (B) was not contained (Comparative Examples 1, 2), the finish of shrinkage was inferior, and if polylactic acid resin (A) or (meth)acrylic resin (B) were contained in an amount outside the range stipulated for the first film (Comparative Examples 3, 4), the draw characteristics were poor, and the finish of shrinkage was inferior. Further, it was demonstrated that when comparing the compounds containing a rubber component (Examples 1, 2, 4 to 6) with one that did not contain a rubber component (Example 3), the low temperature elongation percentage after tensile fracture was better when the rubber component was contained compared to when the rubber component was not contained.

It was thereby demonstrated that the first film is a heat-shrinkable film superior in heat shrinking characteristics, and temperature of 200° C., and after extruding from a T die fitting, was taken up on by a cast roll at 50° C., and was allowed to cool and solidify, yielding a 250-µ thick undrawn sheet with a width of 300 mm. Next, this was transversely drawn uniaxially 5.0 times at a pre-heating temperature of 90° C. and a drawing temperature of 75° C. using a film tenter (manufactured by Mitsubishi Heavy Industries (Co., Ltd.)). The physical properties of the films obtained and the evaluation results are indicated in Table 2.

Moreover, the resins for layer (II) indicated in Table 2 contained polylactic acid resin and silica particles, and undrawn laminated sheets respectively having the stipulated thickness ratios were manufactured by co-extrusion using a 2 type 3 layer feed block so that resin layers for layer (II) were molded on both sides of the mixed resin layer of the aforementioned layer (I). The undrawn sheets were made into heat-shrinkable film with a thickness of 50µ by the same method as described above.

TABLE 2

|  |  |  |  | Example | | | | Comparative Example | | |
|---|---|---|---|---|---|---|---|---|---|---|
|  |  |  |  | 7 | 8 | 9 | 10 | 5 | 6 | 7 |
| Raw material | Layer (I) | Component (A) | PLA1 (mass parts) | 100 | 100 | 100 | 100 | 100 | 100 |  |
|  |  |  | PLA2 (mass parts) |  |  |  |  |  |  | 100 |
|  |  |  | D/L ratio | 5/95 | 5/95 | 5/95 | 5/95 | 5/95 | 5/95 | 0.5/99.5 |
|  |  | Component (B) | PMMA2 (mass parts) | 65 | 35 | 100 | 115 | 15 | 250 |  |
|  |  | Component (C) | Rubber 1 (mass parts) | 55 | 35 | 50 |  |  |  |  |
|  |  |  | Rubber 4 (mass parts) |  |  |  | 15 |  |  |  |
|  |  |  | Rubber 5 (mass parts) |  |  |  | 20 |  |  |  |
|  |  |  | Rubber 6 (mass parts) |  |  |  |  | 30 |  |  |
|  |  | Other | Plasticizer (mass parts) | 12 |  | 8 | 8 | 4 |  |  |
|  | Layer (II) | PLA1 (mass parts) |  |  |  | 100 | 40 |  |  |  |
|  |  | D/L ratio |  |  |  |  | 5/95 |  |  |  |
|  |  | PLA3 (mass parts) |  |  |  |  | 60 |  |  |  |
|  |  | D/L ratio |  |  |  |  | 12/88 |  |  |  |
|  |  | Silica particles (mass parts) |  |  |  |  | 0.3 |  |  |  |
| Layer configuration | Thickness ratio |  | Layer (II) |  |  | (I) | (II)/(I)/(II) |  | (I) |  |
|  |  |  |  |  |  | 30 | 30 |  |  |  |
|  |  |  | Layer (I) | 250 | 250 | 190 | 190 | 250 | 250 | 250 |
|  |  |  | Layer (II) |  |  | 30 | 30 |  |  |  |
| Evaluation of physical properties | 80° C. shrinkage ratio (%) |  |  | 50 | 45 | 43 | 45 | 40 | Cannot draw because of fracture | 4 |
|  | 70° C. storage elastic modulus (E') (MPa) |  |  | 550 | 120 | 800 | 820 | 40 |  | 1100 |
|  | Elongation percentage after tensile breakage (%) |  |  | 262 | 322 | 230 | 300 | 420 |  | 243 |
|  | Finish of shrinkage | (Coverage condition 1) |  | ○ | ○ | ○ | ○ | Δ |  | X |
|  |  | (Coverage condition 2) |  | ○ | ○ | (○) | (○) | ○ |  | X |
|  |  | (Coverage condition 3) |  | ○ | ○ | ○ | (○) | Δ |  | X |
|  | Haze (%) |  |  | 3 | 3 | 3 | 3 | 3 |  | 27 |
|  | Elastic modulus (GPa) |  |  | 2.3 | 2.3 | 2.4 | 2.6 | 2.3 |  | 2.9 |

(Results)

The films having the composition, heat shrinkage rate, and storage elastic modulus (E') stipulated for the second film in Table 2 had superior transparency, elongation percentage after tensile fracture, transparency, and finish of shrinkage. In contrast, the storage elastic modulus (E') and finish of shrinkage were inferior when there was too little (meth)acrylic resin; conversely, the film broke when there was too much (meth)acrylic resin (Comparative Example 6), and it was impossible to measure the mechanical properties and finish of shrinkage. Further, the shrinkage rate was low and the finish of shrinkage was inferior when no (meth)acrylic resin was contained.

It was thereby demonstrated that the second film is superior in such mechanical properties as heat shrinkage characteristics, transparency, and impact resistance, and is also superior in finish of shrinkage.

Examples Relating to the Third Film

Examples 11 to 17

Comparative Examples 8 to 10

A mixed resin obtained by mixing the polylactic acid resins (A), silicone/acrylic composite rubbers (D), and other resin additives indicated in Table 3 was fed into a biaxial extruder (manufactured by Mitsubishi Heavy Industries (Co., Ltd.)), was fused and mixed at the set temperature of 200° C., and after extruding from a fitting at the set temperature of 200° C., was taken up on by a cast roll at 50° C., and was allowed to cool and solidify, yielding a undrawn sheet.

Next, this was drawn longitudinally under the conditions in Table 3 using roll longitudinal drawing equipment, and afterwards this was drawn transversely under the conditions in Tables 3 using a film tenter (manufactured by Kyoto Machinery (Co., Ltd.)), yielding a heat-shrinkable film. The physical properties of the films obtained and the evaluation results are indicated in Table 3.

TABLE 3

|  |  |  |  | Example | | | | | | | Comparative Example | | |
|---|---|---|---|---|---|---|---|---|---|---|---|---|---|
|  |  |  |  | 11 | 12 | 13 | 14 | 15 | 16 | 17 | 8 | 9 | 10 |
| Raw material | Layer (I) | Polylactic acid resin (A) | PLA1 (mass parts) | 75 | 20 | 10 | 20 | 20 | 20 | 30 |  |  | 70 |
|  |  |  | PLA3 (mass parts) |  | 55 | 50 | 30 | 50 | 50 | 30 |  |  |  |
|  |  |  | PLA2 (mass parts) |  |  |  |  |  |  |  | 75 | 100 |  |
|  |  |  | D/L ratio | 5/95 | 10/90 | 11/89 | 9/91 | 10/90 | 10/90 | 8.5/91.5 | 1.5/98.5 | 1.5/98.5 | 5/95 |
|  |  | Silicone/acrylic composite rubber (D) | S2001 (mass parts) | 25 | 25 | 40 | 30 | 20 | 20 | 30 | 25 |  |  |
|  |  | (Meth)acrylic resin (B) | VH01 (mass parts) |  |  |  |  | 20 |  | 10 | 10 |  |  |
|  |  | Rubber component (C) | Rubber 7 (mass parts) |  |  |  |  |  | 10 | 10 |  |  | 30 |

TABLE 3-continued

|  |  |  |  | Example |  |  |  |  |  |  | Comparative Example |  |  |
|---|---|---|---|---|---|---|---|---|---|---|---|---|---|
|  |  |  |  | 11 | 12 | 13 | 14 | 15 | 16 | 17 | 8 | 9 | 10 |
|  | Layer (II) | Polylactic acid resin | PLA1 (mass parts) |  |  |  |  |  |  | 25 |  |  |  |
|  |  |  | PLA3 (mass parts) |  |  |  |  |  |  | 75 |  |  |  |
|  |  |  | D/L ratio |  |  |  |  |  |  | 10/90 |  |  |  |
| Draw conditions | Longitudinal draw |  | Draw temperature (° C.) | 60 | 60 | 60 | 66 | 60 | 63 | 63 | 60 | 60 | 60 |
|  |  |  | Magnification (times) | 1.05 | 1.05 | 1.05 | 1.05 | 1.05 | 1.05 | 1.05 | 1.05 | 1.05 | 1.05 |
|  | Transverse draw |  | Pre-heat temperature (° C.) | 68 | 68 | 68 | 78 | 68 | 72 | 72 | 68 | 68 | 68 |
|  |  |  | Draw temperature (° C.) | 63 | 63 | 63 | 73 | 63 | 69 | 69 | 63 | 63 | 63 |
|  |  |  | Magnification (times) | 4.0 | 4.0 | 4.0 | 4.0 | 4.0 | 4.0 | 4.0 | 4.0 | 4.0 | 4.0 |
| Film thickness (μm) |  |  |  | 50 | 50 | 50 | 50 | 50 | 50 | 50 | 50 | 50 | 50 |
| Evaluation | Heat shrinkage rate (%) |  | Longitudinal | 4 | 1 | 2 | −2.5 | 0.5 | −2 | 0 | 5 | 4 | 4 |
|  |  |  | Transverse | 34 | 37 | 37 | 41 | 43 | 40 | 40 | 30 | 34 | 36 |
|  | Haze value (%) |  |  | 4.6 | 4.5 | 4.9 | 4.5 | 5.1 | 5.2 | 4.4 | 4.6 | 4.6 | 40-50 |
|  | Elongation percentage after tensile fracture (0° C.) |  |  | 352 | 318 | 376 | 247 | 334 | 225 | 287 | 352 | 45 | 89 |
|  | Finish of shrinkage |  |  | ◯ | ◯ | ◯ | (◯) | ◯ | (◯) | (◯) | X | Δ | ◯ |

(Results)

Films comprising the compositions stipulated for the third film in Table 3 were provided with a combination of finish of shrinkage and such mechanical properties as heat shrinkage characteristics, elongation percentage after tensile fracture, and transparency. In contrast, the finish of shrinkage was inferior when the D/L ratio was outside the range of the present invention (comparative Example 8). Moreover, the impact resistance was inferior when silicone/acrylic composite rubber was not contained (Comparative Examples 9 and 10).

It was thereby demonstrated that the third film is a heat-shrinkable film superior in such mechanical properties as heat shrinkage characteristics, impact resistance, and transparency, and is also superior in finish of shrinkage.

Examples Relating to the Fourth Film

Examples 18 to 21

Comparative examples 11 and 12, Reference Example

For the resins of layer (I) indicated in Table 4, a mixed resin was obtained by mixing polylactic acid resin (A), (meth) acrylic resin (B), and rubber component (C) (in the comparative examples, the mixed resins contained 2 kinds selected from polylactic acid resin (A) through rubber component (C)), and for the resins of layer (II) indicated in Table 4, a resin with a main component of polylactic acid resin (A) was obtained. These were individually fed into a biaxial extruder (manufactured by Mitsubishi Heavy Industries (Co., Ltd.)), were fused and mixed at the set temperature of 200° C., and after extruding from a fitting at the set temperature of 200° C. into a "(II)/(I)/(II)" configuration, were taken up on by a cast roll at 50° C., and were allowed to cool and solidify, yielding 200 μm thick undrawn sheets with a width of 300 mm.

Next, these were drawn longitudinally using roll longitudinal draw equipment under the conditions in Table 4, and afterwards were drawn transversely using a film tenter (manufactured by Mitsubishi Heavy Industries (Co., Ltd.)) under the conditions in Table 4, yielding heat-shrinkable films. The results of evaluating the films obtained are indicated in Table 4.

TABLE 4

|  |  |  |  | Example |  |  |  | Comparative Example |  | Reference example |
|---|---|---|---|---|---|---|---|---|---|---|
|  |  |  |  | 18 | 19 | 20 | 21 | 11 | 12 |  |
| Raw material | Layer (I) | Component (A) | PLA1 (mass parts) | 10 | 10 | 55 | 10 | 15 | 15 | 40 |
|  |  |  | PLA3 (mass parts) | 45 | 45 |  | 45 | 60 | 65 | 15 |
|  |  |  | D/L ratio | 10.7 | 10.7 | 5.0 | 10.7 | 12.0 | 12.0 | 6.9 |
|  |  | Component (B) | PMMA2 (mass parts) | 20 | 20 | 20 | 20 |  | 20 | 20 |
|  |  | Component (C) | Rubber 1 (mass parts) | 25 |  | 25 | 25 | 25 |  |  |
|  |  |  | Rubber 6 (mass parts) |  | 25 |  |  |  |  | 25 |
|  | Layer (II) | Component (A) | PLA1 (mass parts) | 50 | 50 | 50 | 40 | 50 | 50 | 40 |
|  |  |  | PLA3 (mass parts) | 50 | 50 | 50 | 40 | 50 | 50 | 15 |
|  |  |  | D/L ratio | 8.5 | 8.5 | 8.5 | 8.5 | 8.5 | 8.5 | 6.9 |
|  |  | Component (B) | PMMA2 (mass parts) |  |  |  | 20 |  |  | 20 |
|  |  | Component (C) | Rubber 6 (mass parts) |  |  |  |  |  |  | 25 |
| Draw conditions | Longitudinal draw |  | Draw temperature (° C.) | 66 | 66 | 66 | 66 | 60 | 66 | 65 |
|  |  |  | Magnification (times) | 1.05 | 1.05 | 1.05 | 1.05 | 1.05 | 1.05 | 1.05 |
|  | Transverse draw |  | Pre-heat temperature (° C.) | 78 | 78 | 78 | 78 | 68 | 78 | 75 |
|  |  |  | Draw temperature (° C.) | 73 | 73 | 73 | 73 | 63 | 73 | 71 |
|  |  |  | Magnification (times) | 4.0 | 4.0 | 4.0 | 4.0 | 4.0 | 4.0 | 4.0 |
| Film thickness (μm) |  |  |  | 50 | 50 | 50 | 50 | 50 | 50 | 50 |
| Evaluation | Heat shrinkage rate (%) |  | Longitudinal | −2 | −3 | 0 | −3 | 7 | −1 | −2 |
|  |  |  | Transverse | 40 | 40 | 41 | 39 | 44 | 40 | 42 |

TABLE 4-continued

|  | Example | | | | Comparative Example | | Reference |
|---|---|---|---|---|---|---|---|
|  | 18 | 19 | 20 | 21 | 11 | 12 | example |
| Haze value (%) | 3.6 | 3.9 | 3.5 | 3.8 | 4.2 | 4.7 | 11.9 |
| Elongation percentage after tensile fracture (0° C.) | 288 | 257 | 267 | 210 | 295 | 6 | 220 |
| Finish of shrinkage | ○ | ○ | ○ | ○ | X | ○ | ○ |

(Results)

According to Table 4, the films comprising the compositions stipulated for the fourth film all exhibited excellent impact resistance, transparency and finish of shrinkage. In contrast, when the film did not contain (meth)acrylic resin (B) (Comparative Example 11), the finish of shrinkage was inferior, and when the film did not contain the rubber component (C) (comparative example 12), the impact resistance was inferior. Further, according to Embodiments 18-21 and the reference example, excellent transparency was obtained by adjusting the D/L ratio of the polylactic acid resin (A) contained in layer (I) and layer (II). It was thereby demonstrated that the fourth film is a heat-shrinkable film superior in such mechanical properties as heat shrinkage characteristics, transparency, and impact resistance, as well as in finish of shrinkage, and is applicable for uses such as shrink packaging, shrink wrap packaging, and heat-shrinkable labels.

INDUSTRIAL APPLICABILITY

The film of the present invention has superior heat shrinking characteristics, and therefore can be used in a variety of applications such as various types of shrink packaging, shrink bundling, and shrinkable labels.

Citations have been made here from the contents of the Descriptions, Claims, Drawings and Abstracts of Japanese Patent Application 2005-138437 filed on May 11, 2005, Japanese Patent Application 2005-358106 filed on Dec. 12, 2005, Japanese Patent Application 2005-378969 filed on Dec. 28, 2005 and Japanese Patent Application 2005-379196 filed on Dec. 28, 2005, and these have been incorporated as disclosures in the Description of the present invention.

What is claimed is:

1. A heat-shrinkable film containing a mixed resin containing (A) a polylactic acid resin and (B) a (meth)acrylic resin, or having at least 1 layer of the mixed resin, wherein the heat shrinkage rate in the film main shrinkage direction when immersed in 80° C. water for 10 seconds is 20% or more wherein the mass ratio of (A) the polylactic acid resin and (B) the (meth)acrylic resin in the mixed resin is (A)/(B)= 95/5 to 60/40, and
wherein (B) the (meth)acrylic resin is a methyl methacrylate homopolymer, or a copolymer consisting essentially of 2 or more monomers selected from the group consisting of methyl (meth)acrylate, ethyl (meth)acrylate, butyl (meth)acrylate, and (meth)acrylic acid.

2. The heat-shrinkable film according to claim 1, wherein the difference (ΔHm-ΔHc) between ΔHm, which is the amount of heat necessary to melt all the crystals contained in the film when heated at a heating velocity of 10° C./min from −40° C. to 250° C. using a differential scanning calorimeter (DSC), and ΔHc, which is the amount of heat produced by crystallization during heat measurement, is 25 J/g or less.

3. The heat-shrinkable film according to claim 1, wherein the storage elastic modulus (E') at 70° C. orthogonal to the main shrinkage direction is 100 MPa or more and 1.5 GPa or less when measured using a viscoelastic spectrometer under conditions of vibration frequency 10 Hz and distortion 0.1%.

4. The heat-shrinkable film according to claim 1, wherein (A) the polylactic acid resin is copolymer of D-lactic acid and L-lactic acid, or a mixture of the copolymers thereof.

5. The heat-shrinkable film according to claim 1, wherein the elongation percentage after tensile fracture orthogonal to the main shrinkage direction is 100% or more when measured at 23° C. and at a draw velocity of 200 mm/minute based on JIS K7127.

6. The heat-shrinkable film according to claim 1, further comprising (C) a rubber component.

7. The heat-shrinkable film according to claim 6, wherein (C) the rubber component content in relation to the total mixed resin is 3 to 45 mass %.

8. A heat-shrinkable film comprising a mixed resin, or having at least 1 layer of the mixed resin, containing (A) a polylactic acid resin and (D) a silicone/acrylic composite rubber as main components with a mass ratio of (A) the polylactic acid resin and (D) the silicone/acrylic composite rubber A/D=of 95/5 to 60/40, wherein the heat shrinkage rate in the film main shrinkage direction when immersed in 80° C. water for 10 seconds is 20% or more.

9. The heat-shrinkable film according to claim 8, wherein (A) the polylactic acid resin comprises a copolymer of D-lactic acid and L-lactic acid, or a mixed resin of this copolymer, and the D/L ratio of the D-lactic acid and L-lactic acid of (A) the polylactic acid resin is 3/97 to 15/85 or 85/15 to 97/3.

10. The heat-shrinkable film according to claim 8, wherein the mixed resin contains (B) the (meth)acrylic resin at 5 to 30 mass % in relation to the total mass thereof.

11. The heat-shrinkable film according of claim 8, wherein the mixed resin contains an aliphatic polyester other than polylactic acid at 5 to 30 mass % in relation to the total mass thereof.

12. The heat-shrinkable film according to claim 8, wherein the elongation percentage after tensile fracture orthogonal to the main shrinkage direction is 100% or more when measured at an atmospheric temperature of 0° C. and at a draw velocity of 100 mm/minute.

13. A heat-shrinkable film having at least 2 layers of a layer (I) comprising a mixed resin containing (A) polylactic acid resin, (B) (meth)acrylic resin, and (C) rubber component, and a layer (II) with a main component of (A) polylactic acid resin,
wherein (B) the (meth)acrylic resin is a methyl methacrylate homopolymer, or a copolymer consisting essentially of 2 or more monomers selected from the group consisting of methyl (meth)acrylate, ethyl (meth)acrylate, butyl (meth)acrylate, and (meth)acrylic acid and
wherein, when drawn in at least 1 axial direction and immersed in 80° C. water for 10 seconds, the shrinkage rate in the main shrinking direction is 20% or more wherein the mass ratio of (A) the polylactic acid resin and (B) the (meth)acrylic resin is (A)/(B)=95/5 to 60/40.

14. The heat-shrinkable film according to claim 13, wherein (B) the (meth)acrylic resin content in the layer (I) is 5 to 30 mass % in relation to the total mass of said mixed resin.

15. The heat-shrinkable film according to claim 13, wherein (C) the rubber component content in the layer (I) is 5 to 50 mass % in relation to the total mass of said mixed resin.

16. The heat-shrinkable film according to claim 13, wherein (A) the polylactic acid resin comprises a copolymer of D-lactic acid and L-lactic acid, or a mixed resin of this copolymer, and the D/L ratio of the D-lactic acid and L-lactic acid of (A) the polylactic acid resin contained in the layer (I) is 5/95 to 15/85 or 85/15 to 95/5, and the D/L ratio of the D-lactic acid and L-lactic acid of (A) the polylactic acid resin contained in the layer (II) is 5/95 to 10/90, or 90.10 to 95/5.

17. The heat-shrinkable film according to claim 6, wherein (C) the rubber component is 1 or more kinds selected from the group consisting of copolymers of lactic acids, aliphatic polyesters, aromatic aliphatic polyesters, aromatic polyesters, copolymers of diols, dicarboxylic acid and lactic acid monomers, core-shell structured rubbers, ethylene-vinyl acetate copolymer, ethylene-(meth)acrylate copolymer, ethylene-ethyl acrylate copolymer, and ethylene-methyl (meth)acrylate copolymer, with the proviso that the copolymers of lactic acids is not (A) polylactic resin.

18. A molded products using the heat-shrinkable film according to claim 1.

19. A heat-shrinkable labels using the heat-shrinkable film according to claim 1.

20. A container fitted with the molded products according to claim 18.

21. A container fitted with the heat-shrinkable label according to claim 19.

22. A molded product using the heat-shrinkable film according to claim 8.

23. A heat-shrinkable label using the heat-shrinkable film according to claim 8.

24. A container fitted with the molded products according to claim 22.

25. A container fitted with the heat-shrinkable labels according to claim 23.

26. A molded product using the heat-shrinkable film according to claim 13.

27. A heat-shrinkable label using the heat-shrinkable film according to claim 13.

28. A container fitted with the molded products according to claim 26.

29. A container fitted with the heat-shrinkable label according to claim 27.

* * * * *